(12) United States Patent
Nishijima et al.

(10) Patent No.: US 7,088,907 B1
(45) Date of Patent: Aug. 8, 2006

(54) VIDEO RECORDING APPARATUS AND METHOD, AND CENTRALIZED MONITORING RECORDING SYSTEM

(75) Inventors: Takeo Nishijima, Kanagawa (JP); Shigeru Akahane, Kanagawa (JP); Fumihiro Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/504,740

(22) Filed: Feb. 16, 2000

(30) Foreign Application Priority Data

Feb. 17, 1999 (JP) ............................. 11-039119

(51) Int. Cl.
*H04N 5/91* (2006.01)
(52) U.S. Cl. .................... 386/46; 386/117; 348/143
(58) Field of Classification Search ............... 386/46, 386/52, 55, 83, 92, 109, 112, 117, 123, 124; 360/13; 348/143, 148, 109, 1
See application file for complete search history.

(56) References Cited

U.S. PATENT DOCUMENTS

| | | | | |
|---|---|---|---|---|
| 4,831,438 A | * | 5/1989 | Bellman, Jr. et al. | 348/148 |
| 5,187,589 A | * | 2/1993 | Kono et al. | 386/83 |
| 5,469,270 A | * | 11/1995 | Yamamoto | 386/55 |
| 5,633,723 A | * | 5/1997 | Sugiyama et al. | 386/46 |
| 5,915,064 A | * | 6/1999 | Choi | 386/46 |
| 5,915,069 A | * | 6/1999 | Nishijima | 386/112 |
| 6,011,901 A | * | 1/2000 | Kirsten | 386/109 |
| 6,259,859 B1 | * | 7/2001 | Katsuki et al. | 386/112 |
| 6,519,416 B1 | * | 2/2003 | Choi et al. | 386/117 |

* cited by examiner

*Primary Examiner*—James J. Groody
*Assistant Examiner*—Christopher Onuaku
(74) *Attorney, Agent, or Firm*—Frommer Lawrence & Haug LLP; William S. Frommer; Thomas F. Presson

(57) ABSTRACT

Disclosed is a video recording apparatus capable of performing long-recording at higher density and certainly associating the video data with additional data. Video images from a plurality of video cameras 101 are captured by a multiplexer 103 while sequentially being switched. A frame compositing unit 1 forms reduced video images by reducing the captured video images and generates a composite video image by displaying the reduced video images on divided parts. A CPU 3 generates additional data related to the reduced video image on each divided part and records the composite video image and additional data onto the same video cassette tape 7 while maintaining the correspondence between each reduced video image and additional data. By recording video images from the plurality of video cameras at higher density, long-recording can be realized. By using the additional data, a desired reduced video image can be retrieved from the recorded composite video image and the retrieved reduced video image can be analyzed.

16 Claims, 21 Drawing Sheets

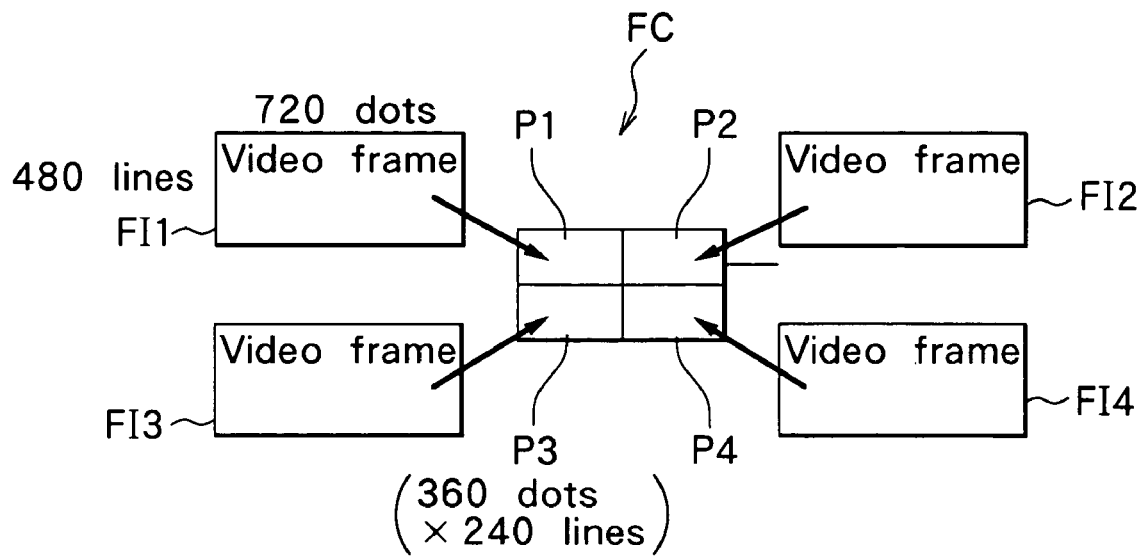
FIG.2
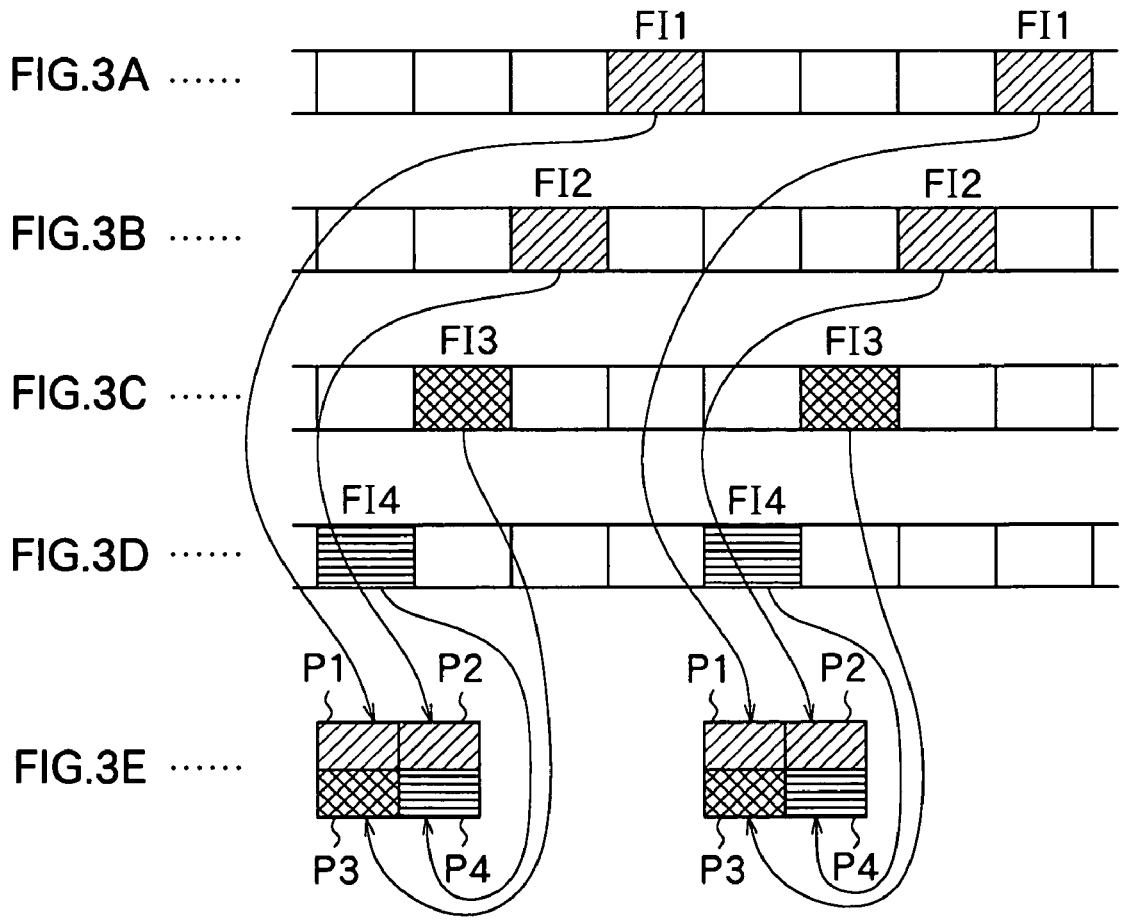
FIG.3A
FIG.3B
FIG.3C
FIG.3D
FIG.3E

TR No.

| | 0 | 1 | 2 | 3 | 4 | 5 | 6 | 7 | 8 | 9 |
|---|---|---|---|---|---|---|---|---|---|---|
| 11 | 13 | 13 | 13 | 13 | 13 | 63 | 63 | 63 | 63 | 63 |
| 10 | FF | FF | FF | FF | FF | 62 | 62 | 62 | 62 | 62 |
| 9 | 13 | 13 | 13 | 13 | 13 | 13 | 13 | 13 | 13 | 13 |
| 8 | 13 | 13 | 13 | 13 | 13 | FF | FF | FF | FF | FF |
| 7 | FF | FF | FF | FF | FF | FF | FF | FF | FF | FF |
| 6 | 13 | 13 | 13 | 13 | 13 | 13 | 13 | 13 | 13 | 13 |
| 5 | 13 | 13 | 13 | 13 | 13 | 63 | 63 | 63 | 63 | 63 |
| 4 | FF | FF | FF | FF | FF | 62 | 62 | 62 | 62 | 62 |
| 3 | 13 | 13 | 13 | 13 | 13 | 13 | 13 | 13 | 13 | 13 |
| 2 | 13 | 13 | 13 | 13 | 13 | FF | FF | FF | FF | FF |
| 1 | FF | FF | FF | FF | FF | FF | FF | FF | FF | FF |
| 0 | 13 | 13 | 13 | 13 | 13 | 13 | 13 | 13 | 13 | 13 |

Sync block No.

|     | Bit-7 | Bit-6 | Bit-5 | Bit-4 | Bit-3 | Bit-2 | Bit-1 | Bit-0 |
|-----|-------|-------|-------|-------|-------|-------|-------|-------|
| PC0 | 0 | 1 | 1 | 0 | 0 | 0 | 1 | 0 |
| PC1 | DS | TM | \multicolumn{4}{c}{TIME ZONE} | | | |
| PC2 | 1 | 1 | \multicolumn{4}{c}{DAY} | | | |
| PC3 | \multicolumn{2}{c}{WEEK} | | \multicolumn{4}{c}{MONTH} | | | |
| PC4 | \multicolumn{6}{c}{YEAR} | | | | | |

FIG.9

|     | Bit-7 | Bit-6 | Bit-5 | Bit-4 | Bit-3 | Bit-2 | Bit-1 | Bit-0 |
|-----|-------|-------|-------|-------|-------|-------|-------|-------|
| PC0 | 0 | 1 | 1 | 0 | 0 | 0 | 1 | 1 |
| PC1 | S2 | S1 | \multicolumn{2}{c}{TENS of FRAMES} | | \multicolumn{4}{c}{UNITS of FRAMES} | | | |
| PC2 | S3 | | \multicolumn{2}{c}{TENS of SECONDS} | | \multicolumn{4}{c}{UNITS of SECONDS} | | | |
| PC3 | S4 | | \multicolumn{2}{c}{TENS of MINUTES} | | \multicolumn{4}{c}{UNITS of MINUTES} | | | |
| PC4 | S6 | S5 | \multicolumn{2}{c}{TENS of HOURS} | | \multicolumn{4}{c}{UNITS of HOURS} | | | |

FIG.10

|  | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 1 | 0 | 1 |
| PC1 | ←——————— MULTI PACK DATA CODE ———————→ | | | | | | | |
| PC2 | TT | 1 | 1 | 1 | ←——————— | | | |
| PC3 | ←——————————— TDP ———————————→ | | | | | | | |
| PC4 | 1 | 1 | ←——————————— | | | | | |

FIG.11

|  | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | VERSION | | | | EXTENSION CODE | | | |
| PC2 | NO OF PACKS | | | | | | | |
| PC3 | | | | | | | | |
| PC4 | | | | | | | | |

FIG.12

| | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 0 | 0 | 0 | 0 |
| PC2 | NO OF PACKS ||||||||
| PC3 | E8 | E7 | E6 | E5 | E4 | E3 | E2 | E1 |
| PC4 | E16 | E15 | E14 | E13 | E12 | E11 | E10 | E9 |

G0

| | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 1 | 1 | 1 | 0 |
| PC2 | NO OF CAMERAS |||| DIVIDE MODE ||||
| PC3 | CAMERA No. (DIVISION-2) |||| CAMERA No. (DIVISION-1) ||||
| PC4 | CAMERA No. (DIVISION-4) |||| CAMERA No. (DIVISION-3) ||||

G1

| | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 1 | 1 | 1 | 0 |
| PC2 | CAMERA No. (DIVISION-6) |||| CAMERA No. (DIVISION-5) ||||
| PC3 | CAMERA No. (DIVISION-8) |||| CAMERA No. (DIVISION-7) ||||
| PC4 | CAMERA No. (DIVISION-10) |||| CAMERA No. (DIVISION-9) ||||

G2

| | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 1 | 1 | 1 | 0 |
| PC2 | CAMERA No. (DIVISION-12) |||| CAMERA No. (DIVISION-11) ||||
| PC3 | CAMERA No. (DIVISION-14) |||| CAMERA No. (DIVISION-13) ||||
| PC4 | CAMERA No. (DIVISION-16) |||| CAMERA No. (DIVISION-15) ||||

| | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 0 | 0 | 0 | 1 |
| PC2 | NO OF PACKS ||||||||
| PC3 | ||||||||
| PC4 | ||||||||

R0

| | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 1 | 1 | 1 | 0 |
| PC2 | S2 | S1 | TENS of FRAMES ||| UNITS of FRAMES |||
| PC3 | S3 || TENS of SECONDS ||| UNITS of SECONDS |||
| PC4 | S4 || TENS of MINUTES ||| UNITS of MINUTES |||

R1

| | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |

R2

| PC3 | S3 || TENS of SECONDS ||| UNITS of SECONDS |||
|---|---|---|---|---|---|---|---|---|
| PC4 | S4 || TENS of MINUTES ||| UNITS of MINUTES |||

R15

| | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 1 | 1 | 1 | 0 |
| PC2 | S2 | S1 | TENS of FRAMES ||| UNITS of FRAMES |||
| PC3 | S3 || TENS of SECONDS ||| UNITS of SECONDS |||
| PC4 | S4 || TENS of MINUTES ||| UNITS of MINUTES |||

|  | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 0 | 0 | 1 | 0 |
| PC2 | NO OF PACKS ||||||||
| PC3 | 1 | 1 | 1 | 1 | CAMERA No. ||||
| PC4 | CAMERA NAME (CHARACTER-0) ||||||||

C1:

|  | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 1 | 1 | 1 | 0 |
| PC2 | CAMERA NAME (CHARACTER-1) ||||||||
| PC3 | CAMERA NAME (CHARACTER-2) ||||||||
| PC4 | CAMERA NAME (CHARACTER-3) ||||||||

C2:

|  | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 1 | 1 | 1 | 0 |
| PC2 | CAMERA NAME (CHARACTER-4) ||||||||
| PC3 | CAMERA NAME (CHARACTER-5) ||||||||
| PC4 | CAMERA NAME (CHARACTER-6) ||||||||

C3:

|  | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 1 | 1 | 1 | 0 |
| PC2 | CAMERA NAME (CHARACTER-7) ||||||||
| PC3 | CAMERA NAME (CHARACTER-8) ||||||||
| PC4 | CAMERA NAME (CHARACTER-9) ||||||||

|      | Bit-7 | Bit-6 | Bit-5 | Bit-4 | Bit-3 | Bit-2 | Bit-1 | Bit-0 |
|------|-------|-------|-------|-------|-------|-------|-------|-------|
| PC0  | 1 | 1 | 1 | 1 | 1 | 0 | 1 | 1 |
| PC1  | 0 | 0 | 0 | 1 | 0 | 0 | 1 | 1 |
| PC2  | NO OF PACKS |||||||| 
| PC3  | Corporate ID |||||||| 
| PC4  | Corporate ID ||||||||

PI0

|      | Bit-7 | Bit-6 | Bit-5 | Bit-4 | Bit-3 | Bit-2 | Bit-1 | Bit-0 |
|------|-------|-------|-------|-------|-------|-------|-------|-------|
| PC0  | 1 | 1 | 1 | 1 | 1 | 0 | 1 | 1 |
| PC1  | 0 | 0 | 0 | 1 | 1 | 1 | 1 | 0 |
| PC2  | Corporate ID |||||||| 
| PC3  | Company ID |||||||| 
| PC4  | Division ID ||||||||

PI1

|      | Bit-7 | Bit-6 | Bit-5 | Bit-4 | Bit-3 | Bit-2 | Bit-1 | Bit-0 |
|------|-------|-------|-------|-------|-------|-------|-------|-------|
| PC0  | 1 | 1 | 1 | 1 | 1 | 0 | 1 | 1 |
| PC1  | 0 | 0 | 0 | 1 | 1 | 1 | 1 | 0 |
| PC2  | Model ID |||||||| 
| PC3  | Model ID |||||||| 
| PC4  | Model ID ||||||||

|  | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | 0 | 0 | 0 | 1 | 0 | 1 | 0 | 0 |
| PC2 | \multicolumn{8}{c}{NO OF PACKS} |
| PC3 | 1 | 1 | 1 | 1 | \multicolumn{4}{c}{DIVISION No.} |
| PC4 | | | | | | | | |

U0

|  | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | \multicolumn{8}{c}{USER DATA-0} |
| PC2 | \multicolumn{8}{c}{USER DATA-1} |
| PC3 | \multicolumn{8}{c}{USER DATA-2} |
| PC4 | \multicolumn{8}{c}{USER DATA-3} |

U1

|  | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | \multicolumn{8}{c}{USER DATA-4} |
| PC2 | \multicolumn{8}{c}{USER DATA-5} |

U2

⋮

|  | Bit-7 | Bit-6 | Bit-5 | Bit-4 | Bit-3 | Bit-2 | Bit-1 | Bit-0 |
|---|---|---|---|---|---|---|---|---|
| PC0 | 1 | 1 | 1 | 1 | 1 | 0 | 1 | 1 |
| PC1 | \multicolumn{8}{c}{USER DATA-28} |
| PC2 | \multicolumn{8}{c}{USER DATA-29} |
| PC3 | \multicolumn{8}{c}{USER DATA-30} |
| PC4 | \multicolumn{8}{c}{USER DATA-31} |

| (D1) C1 | (D2) C2 | (D3) C3 | (D4) C4 |
|---|---|---|---|
| (D5) C5 | (D6) C6 | (D7) C7 | (D8) C8 |
| (D9) C9 | (D10) C10 | (D11) C11 | (D12) C12 |
| (D13) C13 | (D14) C14 | (D15) C15 | (D16) C16 |

FIG.21C

| (D1) C1 | (D2) C2 | (D3) C3 | (D4) C4 |
|---|---|---|---|
| (D5) C5 | (D6) C6 | (D7) C7 | (D8) C8 |
| (D9) C9 | (D10) C10 | (D11) C11 | (D12) C12 |
| (D13) C13 | (D14) C14 | (D15) C15 | (D16) C16 |

| (D1) C1 | (D2) C2 |
|---|---|
| (D3) C3 | (D4) C4 |

FIG.22C

| (D1) C5 | (D2) C6 |
|---|---|
| (D3) C7 | (D4) C8 |

FIG.22D

| (D1) C9 | (D2) C10 |
|---|---|
| (D3) C11 | (D4) C12 |

FIG.22E

| (D1) C13 | (D2) C14 |
|---|---|
| (D3) C15 | (D4) C16 |

FIG.22F

| (D1) C1 | (D2) C2 |
|---|---|
| (D3) C3 | (D4) C4 |

| (D1) C1 | (D2) C2 |
|---|---|
| (D3) C3 | (D4) C4 |

FIG.23B

| (D1) C5 | (D2) C6 |
|---|---|
| (D3) C7 | (D4) C8 |

FIG.23C

| (D1) C9 | (D2) C10 |
|---|---|
| (D3) C11 | (D4) C12 |

FIG.23D

| (D1) C13 | (D2) C14 |
|---|---|
| (D3) C15 | (D4) C16 |

FIG.23E

| (D1) C1 | (D2) C2 | (D3) C3 | (D4) C4 |
|---|---|---|---|
| (D5) C5 | (D6) C6 | (D7) C7 | (D8) C8 |
| (D9) C9 | (D10) C10 | (D11) C11 | (D12) C12 |
| (D13) C13 | (D14) C14 | (D15) C15 | (D16) C16 |

| (D1) C1 | (D2) C2 |
|---|---|
| (D3) C3 | (D4) C4 |
| (D5) C5 | (D6) C6 |
| (D7) C7 | (D8) C8 |

FIG.24C

| (D1) C9 | (D2) C10 |
|---|---|
| (D3) C11 | (D4) C12 |
| (D5) C13 | (D6) C14 |
| (D7) C15 | (D8) C16 |

FIG.24D

| (D1) C1 | (D2) C2 |
|---|---|
| (D3) C3 | (D4) C4 |
| (D5) C5 | (D6) C6 |
| (D7) C7 | (D8) C8 |

FIG.24E

| (D1) C9 | (D2) C10 |
|---|---|
| (D3) C11 | (D4) C12 |
| (D5) C13 | (D6) C14 |
| (D7) C15 | (D8) C16 |

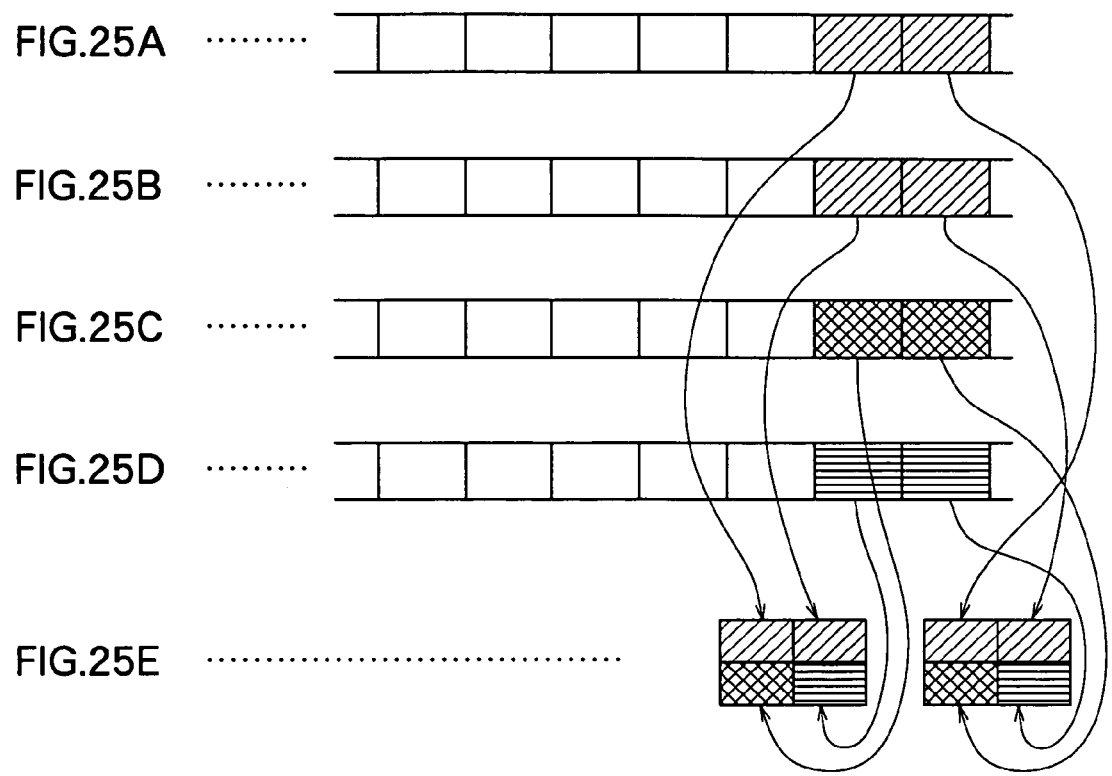

VIDEO RECORDING APPARATUS AND METHOD, AND CENTRALIZED MONITORING RECORDING SYSTEM

BACKGROUND OF THE INVENTION

1. Field of the Invention

The present invention relates to a video recording apparatus and method for recording a plurality of video images supplied and a centralized monitoring recording system capable of collecting video images to be monitored from a plurality of installed monitoring video cameras, recording them onto a recording medium such as a video tape, and monitoring them.

2. Description of the Related Art

In recent years, in the service trade such as a bank in which an automatic teller machine (ATM) is installed, a retail shop which is open until late at night, or a hotel, a monitoring video camera is widely installed for security. In each of the facilities, usually, a plurality of positions are to be monitored so that a plurality of monitoring video cameras have to be installed. Since it is not realistic that a person always monitors video images captured by the monitoring video cameras, usually, the captured video images are recorded by a video cassette recorder (VCR) or the like. When something happens, the recorded video images can be reproduced and watched.

The VCR is, however, usually expensive and the cost of installing VCR for the plurality of monitoring video cameras increases. Consequently, the video images from the plurality of monitoring video cameras are switched in a time division manner and captured in one system and the captured video images are recorded by one VCR. In this case, when the video images from the plurality of monitoring video cameras are recorded as they are sequentially on the same video tape, since the length of the video tape is limited, long-time continues recording cannot be performed.

For example, as disclosed in Japanese Unexamined Patent Application No. 10-108163, a method of reducing video images from a plurality of monitoring video cameras and compositing the reduced video images in combination to form one composite video image has been proposed. According to the method, the video images from the plurality of video cameras can be recorded at high density on a video tape having a limited length, so that recording of longer time can be realized.

One of the objects of the monitoring video system as described above is, when some problem occurs, to check monitoring video images recorded on the video tape later to analyze the status and cause of the problem. Consequently, additional information such as recording date and time is recorded in association with recorded data of each frame or field. For example, in a conventional analog recording system, recording is performed so that additional data is inserted in a vertical blanking period for an image of each field. Since only one video image is included in one field, the correspondence between the video image and the additional data is clear.

In a system of reducing a plurality of video images and combining them to thereby form one composite video image as described above, however, when the composite image in a frame or field and the additional data are associated with each other in a manner similar to the conventional one, from the additional data, the corresponding reduced video image in the composite video image cannot be specified. There is consequently a problem such that, when some trouble occurs and data on the video tape is analyzed later, the additional data cannot be effectively used.

SUMMARY OF THE INVENTION

The invention has been achieved in consideration of the problem and its object is to provide a video recording apparatus, method and a centralized monitoring recording system capable of recording a video image certainly in association with additional data while performing higher-density video recording.

A video recording apparatus of the invention comprises: composite video image generating means for generating reduced video images by reducing each of a plurality of video images supplied and generating a composite video image by compositing the generated reduced video images; additional information generating means for generating additional information for each of supplied video images; and recording means for recording the composite video image and the additional information onto a predetermined recording medium in such a manner of maintaining the correspondence between each of the reduced video images included in the composite video image and each additional information.

A centralized monitoring recording system of the invention comprises: a plurality of video cameras for capturing and outputting video images; composite video image generating means for generating reduced video images by reducing each of a plurality of video images supplied from the video cameras and generating a composite video image by compositing the generated reduced video images; additional information generating means for generating additional information for each of the supplied of video images; and recording means for recording the composite video image and the additional information onto a predetermined recording medium in such a manner of maintaining the correspondence between each of the reduced video images included in the composite video image and each additional information can be maintained. The "system" denotes a logical collection of a plurality of apparatuses and it doesn't matter whether apparatuses of respective configurations are in the same casing or not.

A video recording method of the invention comprises: a step of generating reduced video images by reducing each of a plurality of video images supplied and generating a composite video image by compositing the generated reduced video images; a step of obtaining additional information for each of the supplied video images; and a step of recording the composite video image and the additional information onto a predetermined recording medium in such a manner of maintaining the correspondence between each of the reduced video images included in the composite video image and each additional information.

According to the video recording apparatus or video recording method of the invention, each of the supplied video images is reduced to thereby generate a reduced video image. The generated reduced video images are composited to a composite video image. On the other hand, additional information is generated or obtained for each of the supplied video images. The composite video image and the additional information are recorded on the recording medium in such a manner that the correspondence between each of the reduced video images included in the composite video image and each of the additional information can be maintained.

In the centralized monitoring recording system of the invention, each of the video images supplied from the video cameras is reduced to thereby generate a reduced video image. The generated reduced video images are composited to a composite video image. On the other hand, additional information is generated for each of the supplied video images. The composite video image and the additional information are recorded on the recording medium in such a manner that the correspondence between each of the reduced video images included in the composite video image and each of the additional information can be maintained.

In the video recording apparatus, video recording method, or centralized monitoring recording system of the invention, the video images from the video supply sources (including the video cameras) can be intermittently captured by switching the video images in the time division manner.

In the video recording apparatus, video recording method, or centralized monitoring recording system, it is preferable that the additional information includes at least one of supply source information (including camera identification information) indicative of each of supply sources of the video images, recording date and time information indicative of date and time on/at which each of the video images is recorded, frame division configuration information indicative of the arrangement and the maximum number of the reduced video images in the composite video image, recording apparatus identification information for identifying the video recording apparatus used for recording, and contents information regarding the contents of each of the reduced video images included in the composite video image.

Other and further objects, features and advantages of the invention will appear more fully from the following description.

BRIEF DESCRIPTION OF THE DRAWINGS

FIG. 2 is a diagram for explaining the operation of a frame compositing unit in FIG. 1.

FIG. 3 is a diagram for explaining the operation of the frame compositing unit in FIG. 1.

FIG. 7 is an explanatory diagram showing the structure of a subcode sector in a recording track of the video cassette tape.

FIG. 8 is an explanatory diagram showing the structure of a VAUX sector in a recording track of the video cassette tape.

FIG. 9 is a diagram showing a data structure of a data pack "VAUX REC DATE".

FIG. 10 is a diagram showing a data structure of a data pack "VAUX REC TIME".

FIG. 11 is a diagram showing a data structure of a multi pack header.

FIG. 12 is a diagram showing a general data structure of a data pack positioned at the head of a multi pack group.

FIG. 13 is a diagram showing a data structure of a data pack "GENERAL".

FIG. 15 is a diagram showing a data structure of a data pack "REC TIME OFFSET".

FIG. 16 is a diagram showing a data structure of a data pack "CAMERA NAME".

FIG. 17 is a diagram showing a data structure of a data pack "PRODUCT ID".

FIG. 18 is a diagram showing a data structure of a data pack "USER DATA".

FIGS. 21A to 21C are diagrams showing the correspondence between video images obtained from sixteen video cameras and divided parts in the case where a frame is divided into sixteen divided part.

FIGS. 22A to 22F are diagrams showing the correspondence between video images obtained from sixteen video cameras and divided parts in the case where a frame is divided into four parts.

FIGS. 23A to 23E are diagrams showing an example of re-compositing one frame which is divided into sixteen parts based on four composite frames each of which is divided into four parts.

FIGS. 24A to 24E are diagrams showing the correspondence between video images obtained from sixteen video cameras and divided parts in the case where a frame is divided into eight parts.

FIGS. 25A to 25E are diagrams for explaining a processing method of compositing a frame by capturing and reducing a plurality of video images, not intermittently, but continuously.

DETAILED DESCRIPTION OF THE PREFERRED EMBODIMENTS

Embodiments of the invention will be described in detail hereinbelow with reference to the drawings.

Figure 1:
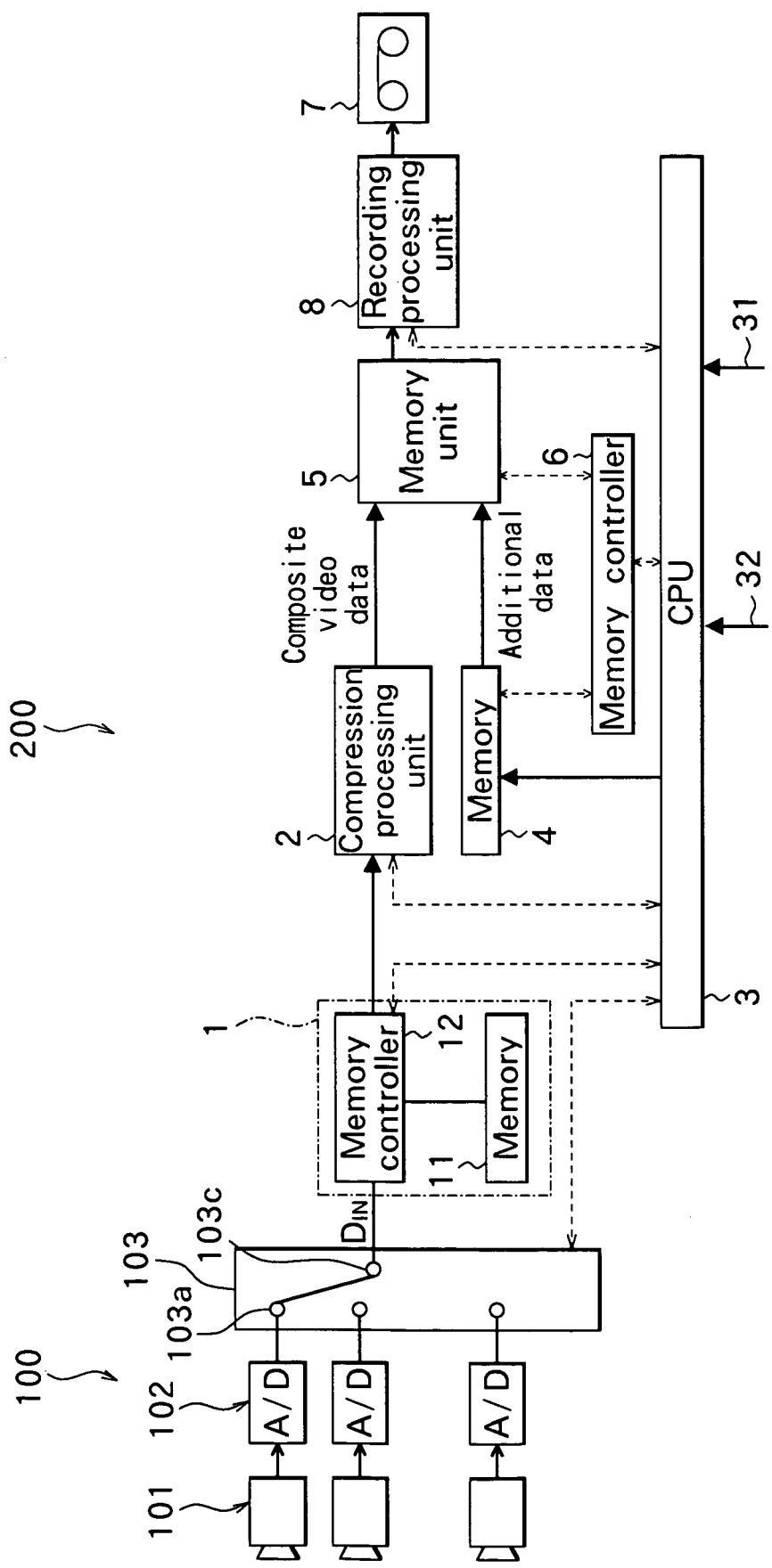
FIG. 1 is a block diagram showing the configuration of a video recording apparatus and a centralized monitoring recording system according to an embodiment of the invention.

FIG. 1 shows the configuration of a centralized monitoring recording system including a video recording apparatus according to an embodiment of the invention. The centralized monitoring recording system according to the embodiment is applied to record monitoring video images captured in a plurality of places in a lump. Since a video recording method according to an embodiment of the invention is embodied by the video recording apparatus of the embodiment, it will be also described hereinbelow.

The centralized monitoring recording system according to the embodiment comprises an external input device 100 and a video recording apparatus 200. Input video data $D_{IN}$ from the external input device 100 is supplied to the video recording apparatus 200.

The external input device 100 comprises a plurality of video cameras 101 each for capturing images in an area to be monitored, a plurality of A/D converters 102 for A/D (analog-to-digital) converting a plurality of image signals outputted from the plurality of video cameras 101, and a multiplexer 103 for selectively obtaining output data of the A/D converters 102 in a predetermined order and outputting the input video data $D_{IN}$.

The multiplexer 103 has a plurality of input terminals 103a to which output signals from the A/D converters 102 corresponding to the plurality of video cameras 101 are supplied and an output terminal 103c to be connected to one of the input terminals 103a. In the multiplexer 103, when the input terminal 103a connected to the output terminal 103c is switched to another input terminal 103a at a predetermined timing, an output signal of the A/D converter 102 is outputted as the input video data $D_{IN}$ in a frame unit from the output terminal 103c. As a result, when attention is paid to a specific video camera 101, video images captured by this video camera 101 are intermittently (with intervals in time) supplied to the video recording apparatus 200. In the case of a video signal of an interlace system in which one frame is comprised of two fields, the switching of the multiplexer 103 is performed field by field. In the following, description will be given on the assumption that the video signal is a signal of the NTSC (National Television System Committee) system.

The video recording apparatus 200 comprises: a frame composition unit 1 for generating one composite video frame by compositing a plurality of frames of the input video data $D_{IN}$ from the multiplexer 103; a compression processing unit 2 for compressing output data of the frame compositing unit 1; and a CPU (Central Processing Unit) 3 for controlling the operation of each of the units in the video recording apparatus 200. The video recording apparatus 200 also comprises: a memory 4 for temporarily storing additional data outputted from the CPU 3; a memory unit 5 for performing processes such as a process of temporarily storing composite video data compressed by the compression processing unit 2 and the additional data outputted from the memory 4; and a recording processing unit 8 for performing a process for recording the composite video data and the additional data outputted from the memory unit 5 onto a video cassette tape 7. Mainly, the frame compositing unit 1 corresponds to an example of "composite video generating means" in the invention. Mainly, the CPU 3 corresponds to an example of "additional information generating means" in the invention. Mainly, the recording processing unit 8 and the CPU 3 correspond to examples of "recording means" in the invention.

In FIG. 1, each arrow with a solid line indicates the flow of video data and additional data. Each arrow with a broken line indicates the flow of a control signal.

The frame compositing unit 1 has a memory 11 for temporarily storing the input video data $D_{IN}$ outputted from the multiplexer 103 in the external input device 100; and a memory controller 12 for designating an address at the time of writing data to the memory 11 and at the time of reading data from the memory 11. The input video data $D_{IN}$ of one frame captured by one of the video cameras 101 in the external input device 100 has, for example as shown in FIG. 2, a data structure of 720 dots×480 lines.

The memory controller 12 performs a sampling process in a procedure which will be described hereinlater on the input video data $D_{IN}$ in each video frame, thereby forming a reduced video image having a data structure of, for example, 360 dots×240 lines as shown in FIG. 2 and combining a plurality of reduced video images to generate one composite video frame. For example, in the example of FIG. 2, video images in four frames FI1 to FI4 captured by the video cameras are reduced to generate four reduced video images P1 to P4. Further, by combining the reduced video images P1 to P4, a composite video frame Fc is formed. When the input video data $D_{IN}$ from the multiplexer 103 is supplied on a field unit basis, for example, first, one frame is generated from two fields and, after that, sampling is performed, thereby forming a reduced video image. Although the case of generating one composite video image from four video images is shown in FIG. 2, as will be described hereinlater, a composite video image can be also generated from video images of the number larger or smaller than four.

The process of generating the composite video frame Fc from the reduced video images P1 to P4 in FIG. 2 is realized by designating an address in the memory 11 by the memory controller 12. For example, it is realized in the following manner. At the stage of writing the reduced video image onto the memory 11, the memory controller 12 divides the memory 11 into four blocks so that the data arrangement of the reduced video images P1 to P4 are the same as that of the composite video frame Fc, and designates an address in each block. At the time of reading of data, the read address is sequentially designated from the head by using the whole memory 11 as one block. On the contrary, at the stage of writing the reduced video image onto the memory 11, data constructing the reduced video images P1 to P4 is sequentially written from the head by regarding the memory 11 as one block. At the time of reading the data, the address designation is performed in the order so that the arrangement of the data of the reduced video images P1 to P4 becomes the same as that of the composite video frame Fc.

FIGS. 3A to 3E show a state where video images from four video cameras 101 are inputted and a composite video image is generated. Each of FIGS. 3A to 3D shows a series of video frames obtained from the video cameras 101 and FIG. 3E illustrates series of generated composite video frames. In FIGS. 3A to 3D, a block element of one picture represents one frame. The video frame on the right side in the diagram is preceding with respect to time. As shown in the diagram, when attention is paid to each of the video cameras 101, it is understood that a video frame from one video camera 101 is supplied intermittently (every four frames).

In FIG. 2 and FIG. 3, the video recording apparatus 200 intermittently records the input video data $D_{IN}$ onto the video caseette tape 7 to thereby allow the long-time recording when in normal mode (i.e., intermittent recording mode).

More specifically, as shown in FIG. 3, input video data $D_{IN}$ is intermittently read out from the memory 11, and as shown in FIG. 2, the composite video frame Fc is formed by the memory controller 12 in such a manner that the intermittent video data is set comes into each of the divided part. In the case of FIG. 2, one composite video frame Fc is outputted from the frame composition unit 1, at a time interval for captuting four frames of the input video data $D_{IN}$. When the compressed composite video frame Fc is recorded on the video cassette tape 7, the recording processing unit 8 controlles so that the video recording onto the video cassette tape 7 is performed not at a primary speed but at a quarter speed. Consequently, the composite video frame Fc each of which is outputted at time intervals of capturing four frames of input data $D_{IN}$ is continuously recorded on the video cassette tape 7. The length of recordable time onto the video cassette tape 7 at quarter speed is quadruple as compared with that at primary speed.

The number of input video data $D_{IN}$ is not limited to four but may be 2, 3, or 5 or more. The number of division of the composite video frame may be set in accordance with the number of sources of the input video data $D_{IN}$. The data recording speed to the video cassette tape 7 may be set to a value which is ½, ⅓ or the like of the primary speed in accordance with the number of sources of the input video data $D_{IN}$.

When the number of sources of the input video data $D_{IN}$ is further generally expressed as "n" (n is an integer of 1 or larger), the number of division of the composite video frame assumes "n". In this case, one frame of the input video data $D_{IN}$ is set into one of the divided parts of the composite video frame at time intervals of (n) frames. By setting the recording speed to 1/n of the primary speed, the length of recordable time in the video cassette tape 7 can be increased by n times as long as that of the primary speed.

In practice, a video image is recorded on the video cassette tape 7 as follows. Composite video frames Fc are stored in the memory 5 at time intervals of a predetermined unit of frames. The composite video frame Fc stored in the memory 5 is read out under the control of the memory controller 6 and recorded onto the video cassette tape 7. The recording speed at this time is determined by the CPU 3 on the basis of the number of signals (the number of sources of the input video data $D_{IN}$) supplied as a part of the setup data 31 and is sent as recording speed information from the CPU 3 to the recording processing unit 8. The recording processing unit 8 controls the recording speed of data onto the video cassette tape 7 on the basis of the recording speed information. As the memory 5, a semiconductor memory can be used. Besides, a disc-shaped recording medium such as a hard disc or a magneto-optical disc may be used.

In the case where the video recording apparatus 200 is applied to, for example, a monitoring system and video data is always intermittently recorded on the video cassette tape 7 as described above, if an emergency occurs, it cannot be always sufficiently dealt with since there is a possibility that video frames corresponding to the decisive moments of the emergency are not fully recorded on the video cassette tape 7 and detailed investigation cannot be performed at a later date.

In the video recording apparatus 200 of the embodiment, when an emergency occurs, the recording mode can be therefore changed from the intermittent recording mode to a full recording mode. More specifically, in the case of emergency, video recording apparatus 200 stops the intermittent capture of the input video data $D_{IN}$ from the plurality of video cameras 101 and starts an operation of capturing only the input video data $D_{IN}$ from the video camera 101 related to the emergency and recording all of the input video data $D_{IN}$ onto the video cassette tape 7. The switching of the recording mode is performed, for example, in the following manner.

Each of the video cameras 101 is provided with an abnormality detecting sensor (not shown). When an abnormality detecting sensor detects an emergency, the abnormality detecting sensor sends an abnormality notification as the external input data 32 to the CPU 3. Upon receipt of the abnormality detecting notification, the CPU 3 controls the multiplexer 103, the frame composition unit 1, and the recording processing unit 8 to switch the recording mode from intermittent recording mode (normal mode) to the full recording mode (emergency mode). To be specific, the CPU 3 stops the switching operation of the multiplexer 103 so that only the input video data $D_{IN}$ from the video camera 101 of which abnormality detecting sensor detects the emergency is supplied to the frame composition unit 1. The CPU 3 also controls the frame composition unit 1 so that the input video data $D_{IN}$ outputted from the multiplexer 103 is supplied as it is (i.e., without composition process) to the compression processing unit 2. Further, the CPU 3 controls the compression processing unit 8 so that compressed video data outputted from the memory 5 is recorded onto the video cassette tape 7 at the primary speed. The CPU 3 may control the compression processing unit 8 so that the video data outputted from the frame composition unit 1 is not compressed but is sent as it is to the memory 5 and recorded.

With such a configuration, under normal circumstances, the video recording apparatus 100 intermittently captures video images from the plurality of video cameras 101, compresses and composites the video images and records the resultant data onto the video cassette tape 7 at a 1/n speed. In the event of an emergency, the video recording apparatus 100 can record only video images from a desired video camera 101 onto the video cassette tape 7 at the primary speed. As a result, video images at many places can be recorded evenly for a long time under normal circumstances. On the other hand, in the event of an emergency, video images of the place where the emergency occurs can be recorded fully, so that detailed investigation can be made at a later date.

Figure 4:
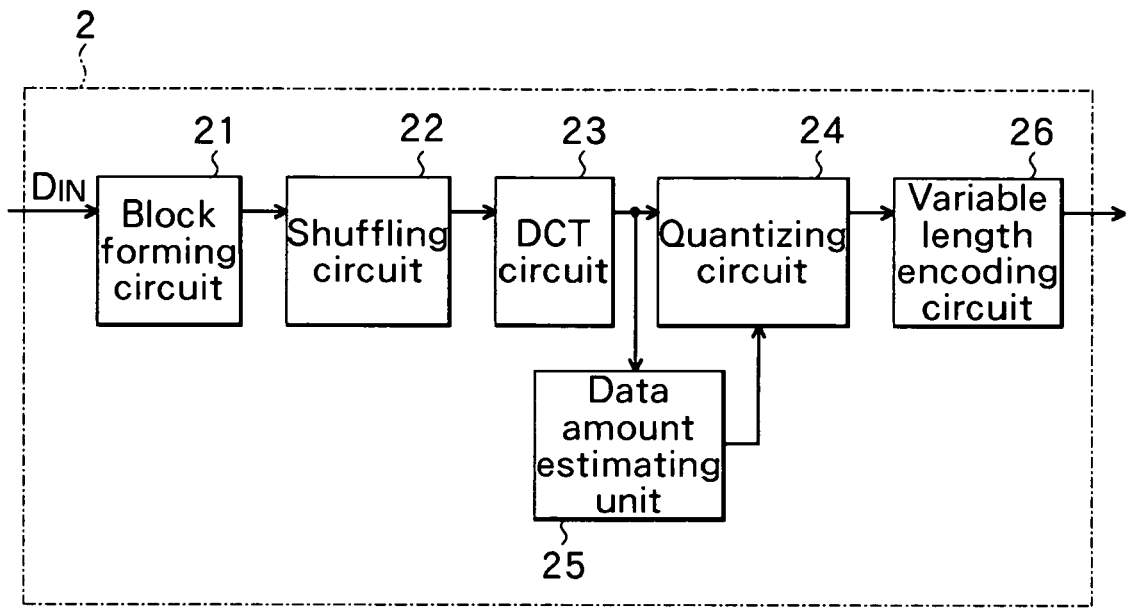
FIG. 4 is a block diagram showing the configuration of a compression processing unit in FIG. 1.

FIG. 4 shows the configuration of the compression processing unit 2. The compression processing unit 2 has: a block forming circuit 21 for dividing supplied video data into predetermined data blocks; a shuffling circuit 22 for rearranging the data blocks divided by the block forming circuit 21 into a predetermined shuffling pattern; a DCT circuit 23 for performing a DCT (Discrete Cosine Transform) process on output data of the shuffling circuit 22; a quantizing circuit 24 for quantizing output data of the DCT circuit 23 in accordance with quantization characteristics based on a quantization table; a data amount estimating unit 25 for estimating a data amount from a coefficient of the DCT after the DCT process in the DCT circuit 23 and switching the quantization table in the quantizing circuit 24; and a variable length encoding circuit 26 for encoding output data of the quantizing circuit 24 in such a manner that the length of the encoded data is variable and outputting resultant data. The compressed composite video data outputted from the variable length coding circuit 26 is supplied to the memory unit 5. The compression processing unit 2 can also have a configuration obtained by eliminating, for example, the data amount estimating unit 25 from the above configuration. The configuration of the compression processing unit 2 is not limited to the system shown in the diagram but can be of another system.

The CPU 3 always monitors a switching timing of the multiplexer 103 in the external input device 100 and controls a frame compositing process in the frame compositing unit 1 on the basis of the switching timing. Specifically, for example, when it is assumed that one composite video image is generated on the basis of video images from four video cameras 101, the CPU 3 notifies the memory controller 12 in the frame compositing unit 1 of the switching timing of the multiplexer 103. Consequently, an operation of supplying data from the multiplexer 103 to the frame compositing unit 1, sampling in the frame compositing unit 1, and an operation of writing reduced video data generated by the sampling to the memory 11 are synchronously performed. When the writing of the four reduced video data to the memory 11 is finished by the control of the memory controller 12 and the reading of data from the memory 11 is started, the reading start timing is notified to the CPU 3. As described above, the CPU 3 can always grasp the process progressing state in the frame compositing unit 1.

Similarly, the CPU 3 transmits/receives a control signal to/from the compression processing unit 2 and also grasps the progressing state of the compressing process.

The CPU 3 further executes a process of generating various additional data with respect to video frames captured by the frame compositing unit 1 via the multiplexer 103 and writing the data to the memory 4. The address designation at the time of the writing operation is performed by a memory controller 6 under the control of the CPU 3. The additional data written to the memory 4 is read by the address designated by the memory controller 6 and written to the memory unit 5. The transfer of the additional data is carried out in synchronization with the writing of the composite video data from the compression processing unit 2 to the memory unit 5.

The additional data includes frame division configuration information indicative of a dividing configuration of the composite video frame generated by the frame compositing unit 1 (that is, the maximum number and arrangement of reduced video images which can be included in one composite video frame), recording date and time information indicative of recording date and time of video data obtained according to a capture signal as a switching timing notification from the multiplexer 103, camera identification information and camera name information indicative of the number and name of the video camera 101 which has outputted the video image, various user information supplied from the outside, and recording apparatus identification information given to the video recording apparatus itself. Among them, the frame division configuration information, camera identification information, camera name information, and recording apparatus identification information is fixed information preset by setup data 31 from the outside. In the following description, each of divided parts in a composite video frame (composite frame) will be called a "divided part" for short. The reduced video image is therefore allocated to and disposed in each divided part.

The user information is included in "contents related information" in the invention. For example, when the video camera 101 is disposed near an automatic teller machine (ATM) in a bank, the user information is a transaction number, a card number, date, time and the like obtained from a cash card of a customer by the ATM synchronously with image capture. The user information includes alarm information in the case where some trouble occurs. The user information of this kind can be supplied as external input data 32 to the CPU 3 via a serial transmission line such as RS232C. The detailed structure and recording format of the additional data will be described hereinlater.

Figure 5:
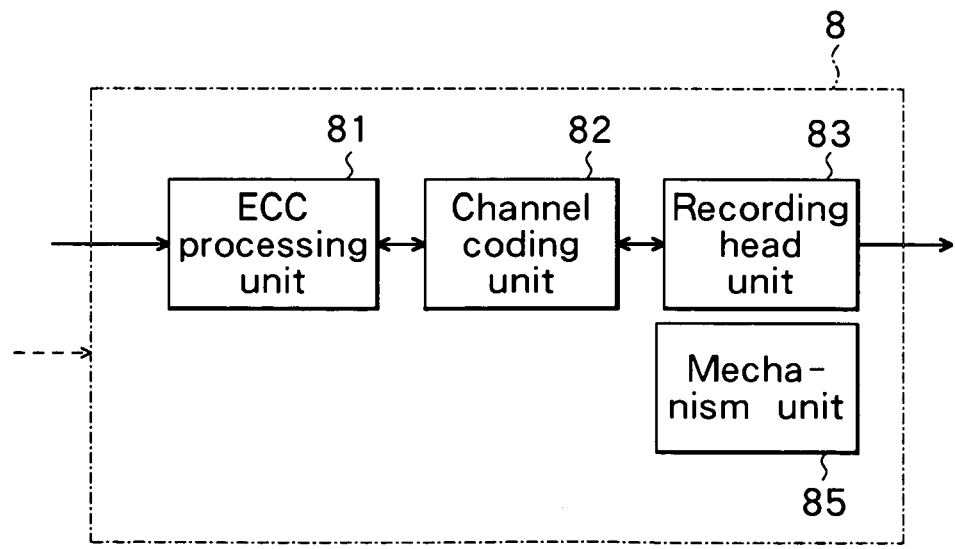
FIG. 5 is a block diagram showing the configuration of a recording processing unit in FIG. 1.

FIG. 5 shows the configuration of the recording processing unit 8. The recording processing unit 8 is to perform a process of recording the composite video data and additional data outputted from the memory unit 5 onto the video cassette tape 7 and has an ECC (Error Correcting Code) processing unit 81, a channel coding unit 82 connected to the ECC processing unit 81, a recording head unit 83 connected to the channel coding unit 82, and a mechanism unit 85 including a traveling system of the video cassette tape 7, a driving unit of a rotary drum, and the like. The recording head unit 83 includes a recording head and the like.

In the recording processing unit 8, at the time of a recording operation, an ECC is added to the output data of the memory unit 5 by the ECC processing unit 81, channel coding for transforming data into a format adapted to be recorded is performed by the channel coding unit 82, and recording is performed onto the video cassette tape 7 by the recording head in the recording head unit 83.

Reference to FIGS. 6 to 18, the recording format of the video data and additional data recorded on the video cassette tape 7 and the details of the additional data will be explained.

First, reference to FIGS. 6 to 8, the outline of the recording format of the video data and additional data recorded on the video cassette tape 7 will be described.

Figures 6A, 6B, 6C:
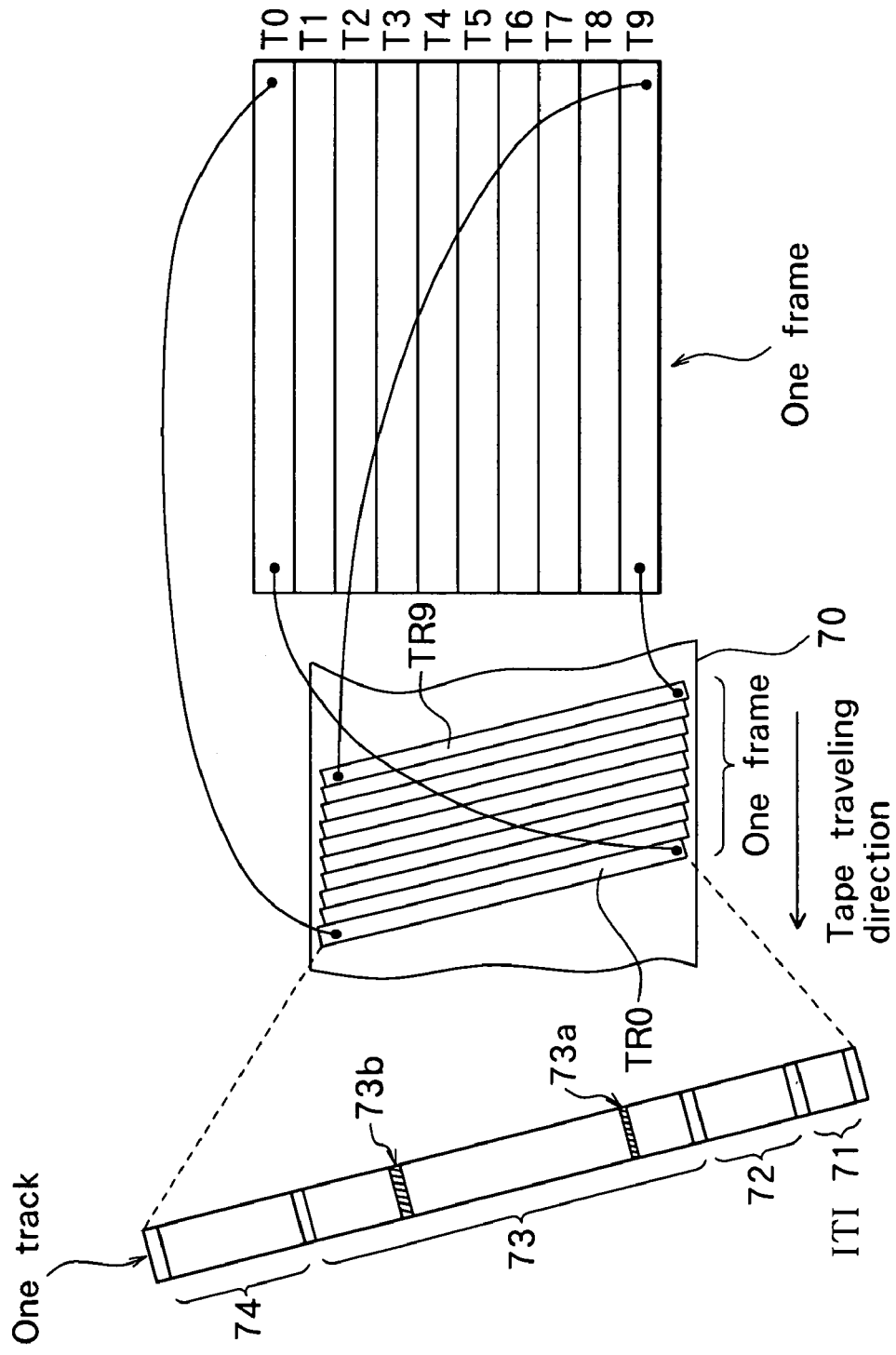
FIGS. 6A to 6C are explanatory diagrams showing a recording format of a video cassette tape.

FIGS. 6A to 6C show a recording format, what is called a DV (Digital Video) tape format, applied to the video cassette tape 7. FIG. 6A shows a video image (still image) of one frame, FIG. 6B shows a track arrangement pattern on a tape 70, and FIG. 6C illustrates a recording format on one track.

As shown in FIGS. 6A and 6B, one frame is divided into ten areas T0 to T9. Data in the areas T0 to T9 is recorded in corresponding ten tracks TR0 to TR9 of the tape 70. Actually, the video data corresponding to each of the areas T0 to T9 of the frame is not recorded as it is onto the tracks of the tape 70 in the video cassette tape 7. The data is subjected to a shuffling process, a sync block forming process, a deshuffling process, and the like by the compression processing unit 2 and the resultant data is recorded on each track.

As shown in FIG. 6C, one track includes an ITI (Insert and Track Information) sector 71, an audio sector 72, a video section 73, and a subcode sector 74 in this order. The ITI sector 71 is located so as to encounter first of sector with the recording head. The ITI sector 71 includes a TIA (Track Information Area) for storing information regarding a track such as track pitch, an APT (Application ID of a Track) indicating that the track data structure of the tape 70 is for either consumer or professional use. The audio sector 72 is an area on which audio data is recorded, and includes an ID part (not shown) and an AAUX (Audio Auxiliary) area (not shown) in which audio auxiliary data is stored.

The video sector 73 is an area in which video data is recorded, and includes an ID part (not shown) and VAUX (Video Auxiliary) areas 73a and 73b in which video auxiliary data is stored. The additional data dealt in the embodiment is mainly recorded in the VAUX areas 73a and 73b. The subcode sector 74 includes an ID part (not shown) and subcode data. The subcode data includes, data mainly for high-speed searching, absolute track numbers necessary for tape management, a title time code functioning as a tape counter, and the like. The title time code expresses the absolute address of each frame by hour/minute/second and the frame number when the head of the tape 70 is used as a reference 0. Each of the video sector 73 and the audio sector 72 consists of a plurality of sync blocks each having a length of 90 bytes. The subcode sector 74 consists of a plurality of sync blocks each having a predetermined length.

FIG. 7 shows the structure of data recorded in the subcode sector 74 shown in FIG. 6. In FIG. 7, the columns extending in the vertical direction correspond to tracks of the track numbers TR0 to TR9 and rows extending in the lateral direction correspond to sync blocks of the sync block numbers 0 to 11. In this case, "13" denotes a sync block in which the title time code is recorded, "62" indicates a sync block in which a data pack "REC DATE" storing the absolute value of year/month/date of recording is recorded, "63" denotes a sync block in which a data pack "REC TIME" storing the absolute value of recording time is recorded, and "FF" denotes a sync block including no special information. The data packs "REC DATE" and "REC TIME" will be described hereinlater.

Figure 8:
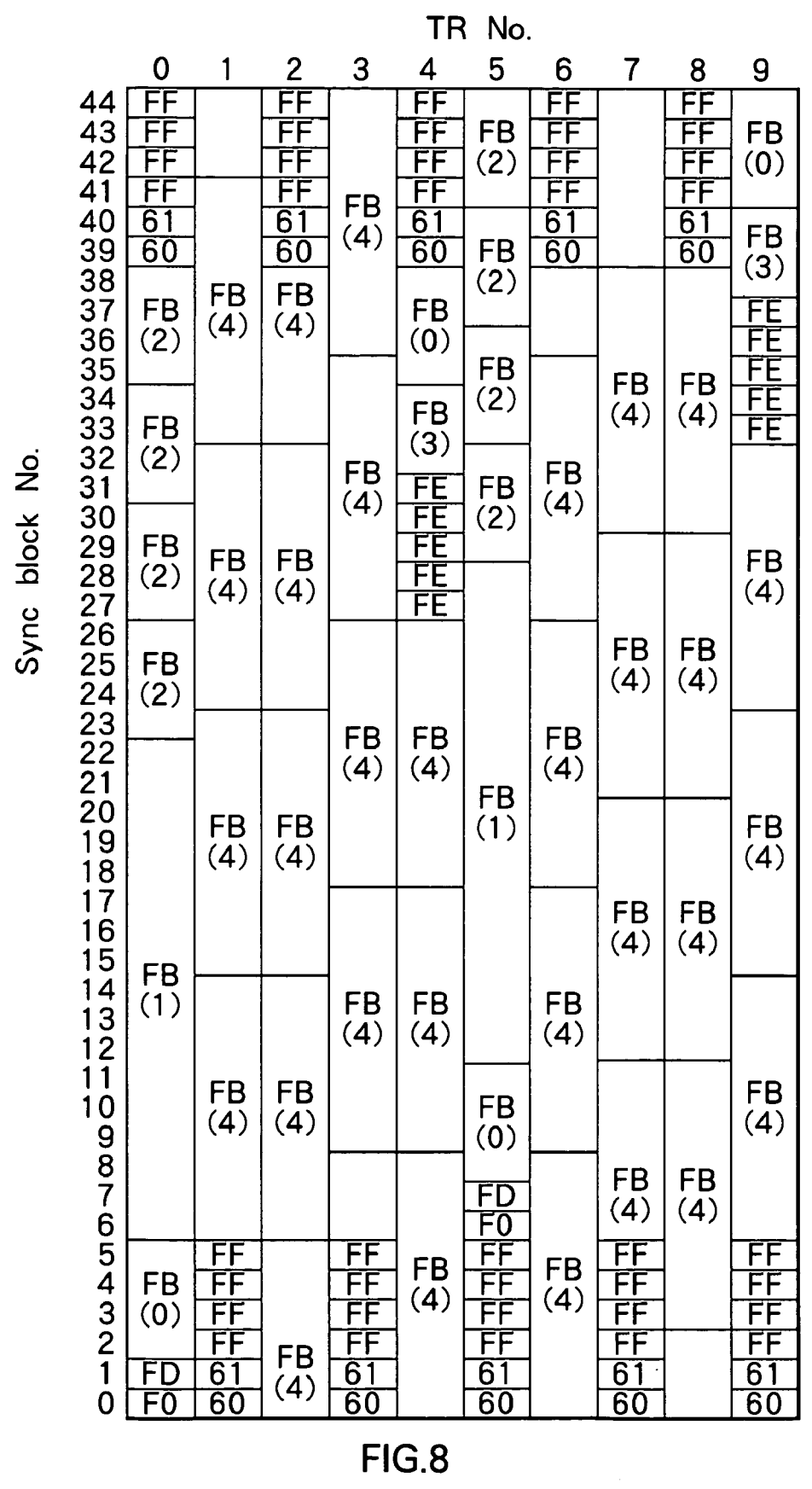

FIG. 8 shows the structure of data recorded in the VAUX areas 73a and 73b in the video sector 73 shown in FIG. 6. In FIG. 8, the columns extending in the vertical direction correspond to tracks of the track numbers TR0 to TR9 and the rows extending in the lateral direction correspond to sync blocks of the sync block numbers 0 to 44.

"60" denotes a sync block in which a data pack "VAUX SOURCE" storing information indicative of a supply source, kind, and the like of a video image is recorded and "61" indicates a sync block in which a data pack "VAUX SOURCE CONTROL" storing various control information regarding a supply source, kind, and the like of a video image is recorded.

"F0" denotes a sync block in which a data pack "MAKER CODE" storing information indicative of the manufacture of the monitoring system is recorded. "FD" denotes a sync block in which a data pack "MULTI PACK HEADER" mainly declaring that it is the head pack of a series of data packs is recorded. "FE" indicates a sync block in which a data pack "MULTI USE PACK" as a dummy pack used for filling an not-used area in the VAUX areas 73a and 73b is recorded. "FF"indicates a sync block including no special information.

"FB(0)" denotes a sync block in which a data pack "GENERAL" storing frame division configuration information expressing the configuration of dividing a composite video frame, camera number information (camera identification information) corresponding to each divided part, and the like is recorded. "FB(1)" denotes a sync block in which a data pack "REC TIME OFFSET" storing recording date and time information indicative of date and time of recording of each reduced video image included in the composite video frame is recorded. "FB(2)" denotes a sync block in which a data pack "CAMERA NAME" storing camera name information is recorded. "FB(3)" indicates a sync block in which a data pack "PRODUCT ID" storing identification information of the recording apparatus is recorded. "FB(4)" indicates a sync block in which a data pack "USER DATA" storing user information is recorded. "FB(5)" denotes a sync block in which a data pack "SUM DATA" storing checksum data for error check is recorded.

Reference to FIGS. 9 to 18 main data packs in the additional data will now be described.

FIG. 9 shows the data structure of the data pack "REC DATE" recorded in the subcode sector 74. FIG. 10 shows the data structure of the data pack "REC TIME" recorded in the subcode sector 74.1. As shown in the diagrams, one data pack consists of data PC0 to PC4 of 5 bytes (40 bits). The head byte PC0 shows the kind of the data pack and four bytes of PC1 to PC4 indicate specific data contents. Each of the other data packs described hereinbelow has a similar structure.

In the data pack "REC DATE" shown in FIG. 9, the code "62h" in the head byte PC0 indicates that the data pack shows recording date of the video image (to be accurate, the date on which the video image (reduced video image) at the head is captured). In the following four bytes PC1 to PC4, the recording year/month/date and the day of the week are recorded. Specifically, "DAY" represents the recording date (1 to 31), "MONTH" shows the recording month (1 to 12), and "YEAR" represents lower two digits (00 to 99) of the recording year (in the year of grace). Each of them is shown by a BCD (Binary Coded Decimal) code. "WEEK" shows the recording day of the week (Sunday to Saturday) in a binary code (000 to 110). Each bit of "DS", "TM" and "TIME ZONE" is fixed data (="1").

In the data pack "REC TIME" shown in FIG. 10, the code "63h" in the head byte PC0 represents that the data pack shows recording time of the video image (to be accurate, the absolute time when the head video image (reduced video image) is captured). In the following four bytes PC1 to PC4, the recording time is recorded. Specifically, frame number (0 to 29) is stored in PC1, second (0 to 59) is stored in the PC2, minute (0 to 59) is stored in PC3 and hour (0 to 23) is stored in PC4. Each of them is shown by a BCD code. "TENS of . . . " indicates the tens digit and "UNITS of . . . " indicates the units digit. Each of the bits "S1" to "S6" is fixed data (="1"). The data packs "REC DATE" and "REC TIME" are generated on the basis of a calendar timer function of the CPU 3.

FIG. 11 shows a data structure of a data pack disposed at the head of a recording area of a plurality of data packs (hereinbelow, referred to as a multi pack area) in the VAUX areas 73a and 73b, which is called a multi pack header. In the multi pack header, a code "FDh" declaring that the data pack and subsequent data packs are in the multi pack area is stored in the head byte PC0. "MULTI PACK DATA CODE" in PC1 to PC2 shows the use of the following plural data packs. In the embodiment, it is fixed to data "003h" indicating that the data packs are used for monitoring (security). "TDP" in PC3 to PC4 shows the number of data packs following the pack. "TT" indicates fixed data (="1").

FIG. 12 shows a general form of the data pack positioned at the head of a group comprised of a series (a cluster) of data packs (hereinbelow, called a multi pack group) in a multi pack area subsequent to the multi pack header. In the data pack, a code "FBh" declaring that the data pack is at the head of the multi pack group is stored in the head byte PC0. In the embodiment, "EXTENSION CODE" in PC1 is defined as an extension for monitoring. The extension codes are defined as follows.

"0000": data pack "GENERAL"

"0001": data pack "REC TIME OFFSET"

"0010": data pack "CAMERA NAME"

"0011": data pack "PRODUCT ID"

"0100": data pack "USER DATA"

"0101": data pack "SUM DATA"

"0110" to "1101": not used

"1110": data pack "CONTINUE". To be specific, in the data pack, data is continued from the immediately preceding data pack.

"1111": no information

The data structure of each of the data packs "GENERAL", "REC TIME OFFSET", "CAMERA NAME", "PRODUCT ID", and "USER DATA" will be described hereinlater.

"VERSION" in PC1 indicates the version related to the code of each extension, the data structure of the pack, and arrangement of packs in a part of the VAUX sector. In the example of the diagram, version 1 is shown. "NO OF PACKS" in PC2 indicates the number of data packs of the self pack and subsequent data packs. Each of PC3 and PC4 is properly defined according to the kind of the data pack.

FIG. 13 shows the data structure of the data pack "GENERAL". The data pack comprises the head data pack G0 having the structure shown in FIG. 12 and subsequent three data packs G1 to G3. The meaning of each of PC0 and PC1 in the head pack G0 is as described in FIG. 12. "EXTENSION CODE" is set to "0000", that is, "GENERAL". In the embodiment, "NO OF PACKS" in PC2 in the head data pack G0 is set to "03h", that is, three packs. The value changes according to the number of division of a frame.

Each bit in PC3 and PC4 in the head data pack G0 has data indicating whether a reduced video image exists in each divided part of a composite vide frame or not. In the embodiment, one composite vide frame can be divided into sixteen divided parts at maximum and each of video images from sixteen video cameras 101 can be displayed as a reduced video image on each divided part. Each of bits E1 to E16 of PC3 and PC4 in the head data pack G0 shows whether a reduced video image exists in each of the 16 divided parts or not by "1" or "0". For example, when the bit E1 is "0", it shows that no reduced video image exists in the first divided part. More specifically, when the composite video is displayed on a screen of a predetermined display device, the area on the screen corresponding to the first divided part (DIVISION-1) is in a blank display state.

The meaning of each of PC0 and PC1 in each of the subsequent data packs G1 to G3 is as explained with reference to FIG. 12. For example, the lower four bits "1110" of PC1 in the data pack indicates "CONTINUE", that is, the data is continued from the immediately preceding data pack.

Figure 14A:
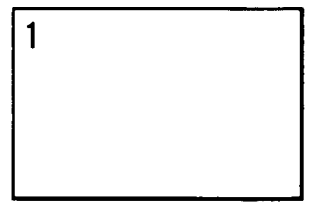
FIGS. 14A to 14G are explanatory diagrams showing some examples of a frame dividing method.
Figure 14B:
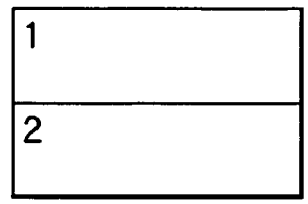
Figure 14C:
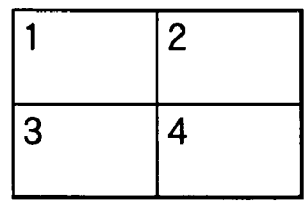
Figure 14D:
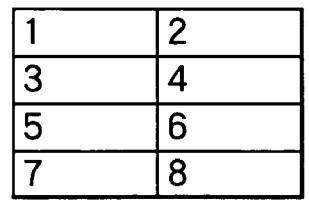
Figure 14E:
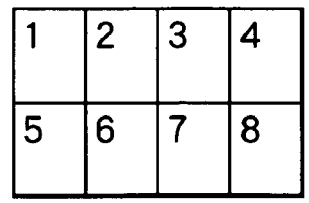
Figure 14F:
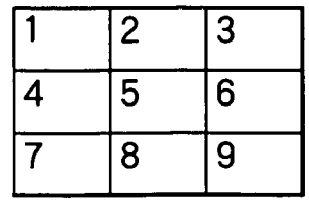
Figure 14G:
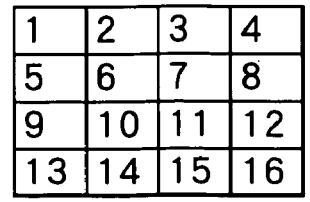

"NO OF CAMERAS" in PC2 in the data pack G1 expresses the installation number of the video cameras 101 in four bits. "DIVIDE MODE" represents a division form of a composite video frame as shown in FIG. 14 in four bits. FIGS. 14A to 14G show the kinds of a division form of a composite video frame. FIG. 14A shows a case where no division is performed. FIG. 14B shows a case where a composite frame is divided into two parts in the vertical direction. FIG. 14C shows a case where a composite frame is divided into four parts in total, two parts in the vertical direction and two parts in the lateral direction. FIG. 14D shows a case where a composite frame is divided into eight parts in total, two parts in the lateral direction and four parts in the vertical direction. FIG. 14E shows a case where a composite frame is divided into eight parts in total, four parts in the lateral direction and two parts in the vertical direction. FIG. 14F shows a case where a composite frame is divided into nine parts in total, three parts in each of the lateral and vertical directions. FIG. 14G shows a case where a composite frame is divided into 16 parts in total, four parts in each of the lateral and vertical directions.

Each of "CAMERA No. (DIVISION-1)" to "CAMERA No. (DIVISION-16)" in PC3 and PC4 in the data pack G1 and in PC2 to PC4 in the data packs G2 and G3 expresses the camera number of the video camera 101 which has captured the reduced video image displayed on each of the divided parts (DIVISION-1 to DIVISION-16) in four bits.

FIG. 15 shows the data structure of the data pack "REC TIME OFFSET". The data pack includes data which expresses capture time of the reduced video image in each divided part of a composite frame. Each capture time means an offset (differential data) from the capture date-and-time (absolute time) stored in the data packs "REC DATE" and "REC TIME" in the subcode sector 74. The data pack "REC TIME OFFSET" is generated by using the calendar timer function of the CPU 3.

The meaning of each of PC0 and PC1 in the head data pack R0 is as explained in FIG. 12. "EXTENSION CODE" is set to "0001", that is, "REC TIME OFFSET". In the embodiment, "NO OF PACKS" in PC2 in the head data pack R0 is set to "10h", that is, 16 packs. The value changes according to the number of division of a frame.

Each of the following data packs R1 to R16 represents offset information indicative of the capture time of each of the reduced video images in the divided part (DIVISION-1 to DIVISION-16) by minute, second and frame. For example, the absolute capture time of the reduced video image on a divided part (DIVISION-i) is therefore obtained by adding data of data pack Ri to the capture date and time stored in the data packs "REC DATE" and "REC TIME" (FIGS. 9 and 10) in the subcode sector 74. In this case, i=1 to 16. When attention is paid to, for example, the data pack R1, in PC2, offset information indicative of capture time of the reduced video image on the divided part (DIVISION-1) is stored in the unit of the frame number of the reduced video image (1 to 29). In PC3, offset information indicative of capture time of the reduced video image is stored in the unit of second(s) (0 to 59). In PC4, offset information indicative of capture time of the reduced video image is stored in the unit of minute(s) (0 to 59). The other divided parts (DIVISION-2 to DIVISION-16) are similar to the above.

The meaning of PC0 and PC1 in each of the data packs R1 to R16 is as described in FIG. 12. For example, the lower four bits of PC1 in each data pack represents "CONTINUE", that is, data is continued from the immediately preceding data pack. Any of "S1" to "S4" is fixed data (="1").

FIG. 16 shows the data structure of the data pack "CAMERA NAME". The data pack indicates the name of a camera of each camera number defined by the data pack "GENERAL" shown in FIG. 13. As a camera name, it is preferable to use the name of a place in which the video camera is installed. For example, "entrance", "locker room", "lobby", "ATM-No. 1", and the like are used.

The meaning of PC0 and PC1 in the head data pack C0 is as described in FIG. 12. "EXTENSION CODE" is set to "0010", that is, "CAMERA NAME". In the embodiment, "NO OF PACKS" in PC2 in the head data pack C0 is set to "03h", that is, three packs. The value changes according to the number of video cameras.

"CAMERA No." in PC3 in the head data pack C0 denotes any of the camera number (1 to 16) defined by the data pack "GENERAL" shown in FIG. 13.

In each of PC4 in the data pack C0 and PC2 to PC4 in the subsequent data packs C1 to C3, data expressing characters of the camera name by an ASCII code is stored. In the embodiment, therefore, 10 characters (CHARACTER-1 to CHARACTER-9) can be set as the name of a camera.

FIG. 17 shows the data structure of the data pack "PRODUCT ID". The data pack is used to store recording apparatus identification information for specifying a video recording apparatus used for recording a video image. The recording apparatus identifying information is important to increase an evidence effectiveness of the recorded video image when some trouble occurs.

The meaning of PC0 and PC1 in the head data pack PI0 is as described in FIG. 12. "EXTENSION CODE" is set to "0011", that is, "PRODUCT ID". In the embodiment, "NO OF PACKS" of PC2 in the head data pack PI0 is set to "02h", that is, two packs.

In PC3 in the head data pack PI0 and PC2 to PC4 in the subsequent data packs PI1 and PI2, identification information indicative of the manufacturer of the video camera 101 "Corporate ID", "Company ID" and "Division ID" and identification information "Model ID" indicative of the model number (for example, production number) of the video recording apparatus are stored.

FIG. 18 shows the data structure of the data pack "USER DATA". The data pack is used to store various user information inputted as the external input data 32 (FIG. 1) from an external system. The user information includes, as described above, the alarm information in the case where some trouble occurs, and transaction number, card number, date, and time obtained from a cash card of a customer by the ATM synchronously with capture of an image by the video camera. The information is important to analyze the recorded video images later.

The meaning of PC0 and PC1 in the head data pack U0 is as described in FIG. 12. "EXTENSION CODE" is set to "0100", that is, "USER DATA". In the embodiment, "NO OF PACKS" in PC2 in the head data pack U0 is set to "08h", that is, eight packs.

In "DIVISION No." in PC3 in the head data pack U0, data (1 to 16) indicative of the correspondence between the user information and each of a reduced video images on divided parts is stored. Consequently, each video camera 101 can be associated with the user information.

In PC1 to PC4 in the subsequent data packs U1 to U8, the user information "USER DATA-0" to "USER DATA-31" of total 32 bytes is stored.

The operation of the video recording apparatus having the configuration as mentioned above will now be described. In the following description, the video recording method according to the embodiment will be also explained.

Figure 19:
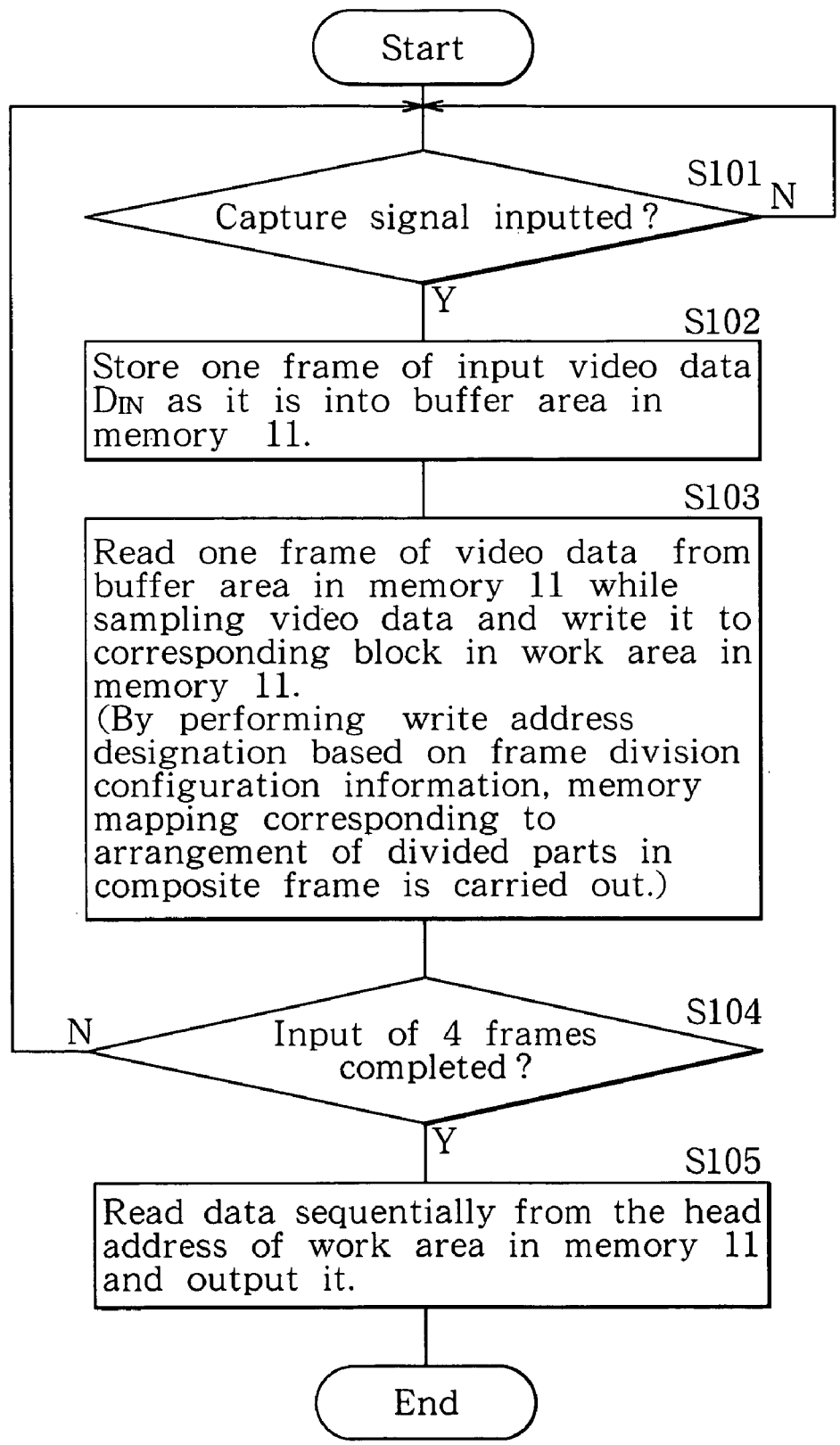
FIG. 19 is a flowchart for explaining a frame compositing process in the video recording apparatus of the embodiment.
Figure 20:
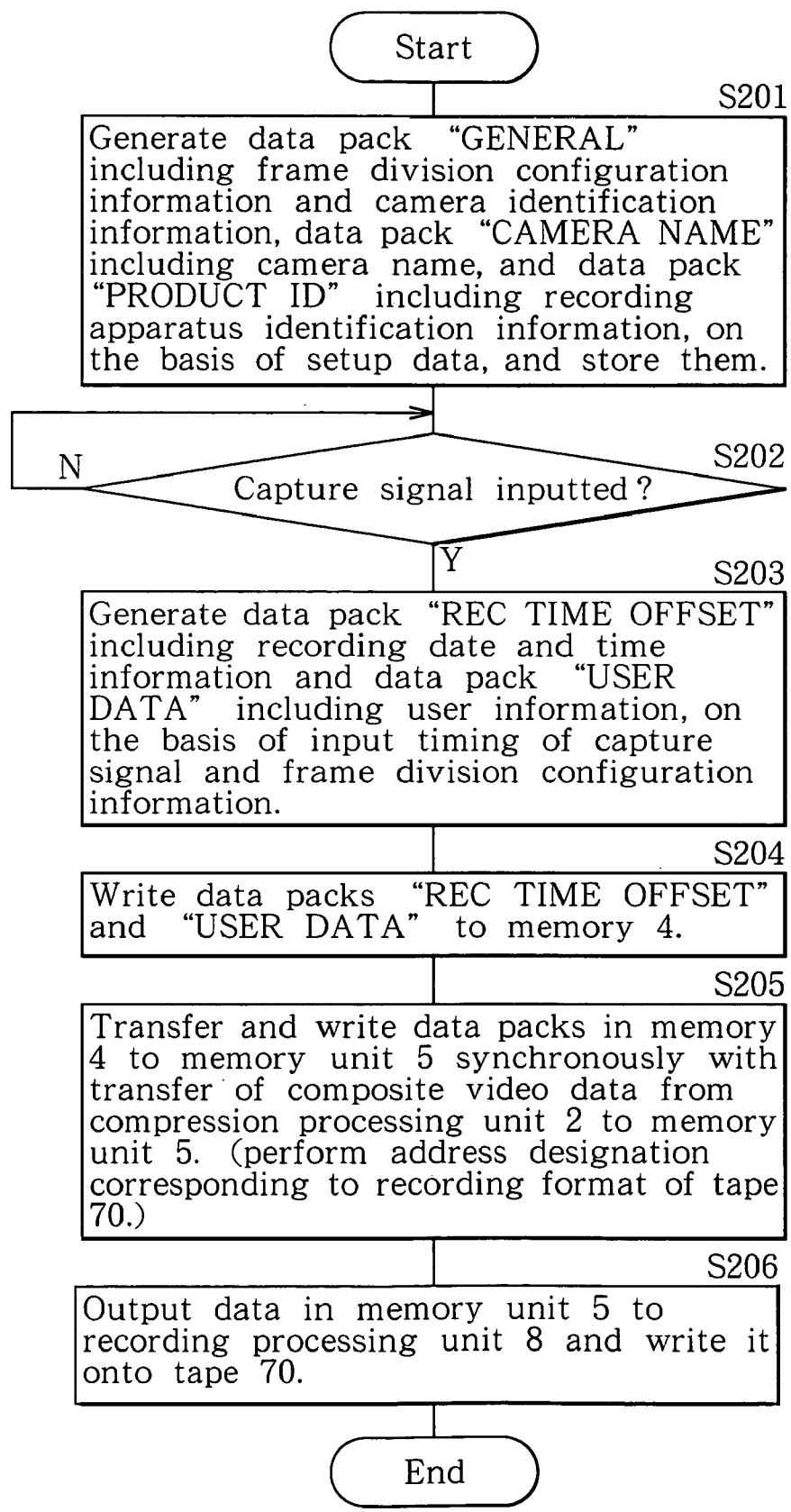
FIG. 20 is a flowchart for explaining the operation from a process of generating additional data to a process of recording composite video data and the additional data onto a tape in the video recording apparatus of the embodiment.

First, with reference to the block diagram shown in FIG. 1 and the flowcharts shown in FIGS. 19 and 20, the main operation of the video recording apparatus according to the embodiment will be described. FIG. 19 mainly shows a schematic operation of the memory controller 12 in the frame compositing unit 1. FIG. 20 shows a schematic operation of the CPU 3 and the memory controller 6. As an example, the case of compositing video images of four systems captured by the four video cameras 101 into one composite video frame will be explained here.

Each of the video cameras 101 in the external input device 100 supplies a captured analog video image to each of the A/D converters 102. The A/D converter 102 converts the inputted analog video image to digital data and supplies the digital data to the multiplexer 103. By sequentially selecting one of the inputted digital video images, the multiplexer 103 intermittently captures the video images of four systems as shown in FIGS. 3A to 3D.

The input video data $D_{IN}$ captured by the multiplexer 103 is supplied to the frame compositing unit 1. The memory controller 12 in the frame compositing unit 1 performs a process of reducing each of four video images and compositing reduced video images into one composite video image by a procedure as shown in FIG. 19. Specifically, in FIG. 19, when a capture signal outputted according to the switching timing in the multiplexer 103 is received via the CPU 3 (Y in step S101), the memory controller 12 receives a frame of input video data $D_{IN}$ and stores it as it is in the buffer area in the memory 11 (step S102).

The memory controller 12 reads a frame of video data stored in the buffer area in the memory 11 while sampling it and writes it into a predetermined block in the work area in the memory 11. At this time, the memory controller 12 designates the writing address on the basis of the frame division configuration information given by the CPU 3, thereby executing memory mapping corresponding to the arrangement of the divided parts in the composite video frame (step S103).

Similarly, the memory controller 12 writes reduced video data in the second to fourth frames into the work area in the memory 11 (steps S101 to S103). When four frames of input are completed (Y in step S104), the memory controller 12 reads the data sequentially from the head address in the work area in the memory 11 and outputs it (step S105). As shown in FIG. 3, four frames of video images which are captured by the four video cameras 101 and inputted in the time division manner are reduced, and a frame of composite video image is generated.

The composite video image generated by the frame compositing unit 1 is supplied to the compression processing unit 2 and compressed, and result data is outputted.

In FIG. 20, on the basis of the setup data 31 supplied from the outside, the CPU 3 generates additional data such as the data pack "GENERAL" including the frame division configuration information and camera identification information, the data pack "CAMERA NAME" including the camera name, and the data pack "PRODUCT ID" including the recording apparatus identification information and stores the additional data into the memory 4 (step S201 in FIG. 20).

When the capture signal is supplied from the multiplexer 103 (step S202 in FIG. 20), the CPU 3 generates the additional data such as the data pack "REC TIME OFFSET" including the recording date and time information and the data pack "USER DATA" including user information on the basis of the input timing of the capture signal, the frame division configuration information, and the external input data 32, controls the memory controller 6, and writes the data packs into the memory 4 (step S204).

The CPU 3 controls the memory controller 6 to transfer and write the additional data (data packs) in the memory 4 to the memory unit 5 synchronously with the transfer of the composite video data from the compression processing unit 2 to the memory unit 5. At this time, the memory controller 6 designates a write address so as to perform the memory mapping corresponding to the recording format (FIGS. 6 to 8) on the tape 70 (step S205).

The CPU 3 controls the memory controller 6 to allows the data in the memory unit 5 to be outputted to the recording processing unit 8 in accordance with an order from the head address and to be written onto the tape 70 (step S206). By the process, the composite video data and additional data is recorded in the arrangement as shown in FIGS. 6 to 8 in the subcode sector 74 and the VAUX areas 73*a* and 73*b* in the video sector 73 of the tape 70.

As mentioned above, according to the video recording apparatus, video recording method, or centralized monitoring recording system of the embodiment, the video images from the plurality of video cameras 101 are captured while sequentially switching them, the captured video images are reduced to generate reduced video images, the reduced video images are displayed on divided parts to thereby generate a composite video image, and the composite video image is recorded on the video cassette tape. Thus, the video images from the plurality of video cameras can be recorded at high density, thereby enabling longer-time recording to be realized by using a tape of a limited length. According to the embodiment, the additional data related to each reduced video image is generated and the composite video image and additional data is recorded on the same video cassette tape while maintaining the correspondence between each of the reduced video images and each of the additional data, so that the additional information can be obtained every reduced video image of each divided part. By using the additional data, a desired reduced video image can be retrieved from the recorded composite video image and the retrieved reduced video image can be analyzed.

When the composite video image recorded by the video recording apparatus of the embodiment is reproduced using a display device, the video image captured by the same video camera 101 is always displayed on one of the divided parts in the screen of the display device. Either by displaying the composite video image and the additional data upon the recording of them or by immediately reproducing the composite video image and the additional data which is once recorded, the states of a plurality of places can be simultaneously monitored on one screen almost in a real time manner from both of the aspects of the video image and the additional information.

According to the video recording apparatus of the embodiment, by switching the video images outputted from the plurality of video cameras 101 in the time division manner, the video images of each video camera are intermittently captured. While using the video cassette tape 7 of a limited recording capacity, recording of longer time can be therefore realized. Further, according to the video recording apparatus of the embodiment, since the video image is compressed and recorded, longer time recording can be performed.

The case of reducing and compositing video images from the four video cameras 101 to generate one composite video image has been explained as an example in the description of the operation of the embodiment. For example, also when video images from two, eight, nine, or sixteen video cameras 101 are composited to one frame in a manner shown in FIG. 14, the basic operation is similar. For example, as shown in FIG. 21A, when video images C1 to C16 from 16 video cameras 101 are composited into one frame, the video images C1 to C16 are allocated to 16 divided parts D1 to D16, respectively, as illustrated in FIGS. 21B, 21C, . . .

The installation number of the video cameras 101 and the frame division number (the number of division in a composite video frame) do not always have to coincide with each other. For example, as shown in FIG. 22A, it is also possible to divide the video images C1 to C16 from the 16 video cameras 101 into four groups each of which has four video images and generate one composite video image from four video images of each group. Specifically, the video images C1 to C4 of the first group are respectively allocated to divided parts D1 to D4 of one composite video frame as shown in FIG. 22B, the video images C5 to C8 in the second group are respectively allocated to divided parts D1 to D4 in the next composite video frame as illustrated in FIG. 22C, the video images C9 to C12 in the third group are respectively allocated to divided parts D1 to D4 of the following composite video frame as shown in FIG. 22D, and the video images C13 to C16 in the fourth group are respectively allocated to the divided parts D1 to D4 of the following composite video frame as shown in FIG. 22E. Similarly, the process of generating the composite video frame 22B to 22E is repeated.

In the case of reproducing just as it is the composite video image recorded in a manner shown in FIG. 22 using a display device, the video images from different video cameras 101 are sequentially displayed in one of the divided parts in the screen of the display device. In this case, for example, as shown in FIGS. 23A to 23E, each of the reduced video images on the divided parts in a series of four composite video frame shown in FIGS. 23A to 23D is further reduced at the time of reproduction. The further reduced video images are rearranged and allocated to the 16 divided parts as shown in FIG. 23E, thereby generating and displaying one composite video frame. Consequently, the video images captured by the same video camera 101 can be always displayed in one of the divided parts in the composite video frame on the screen.

For example, as shown in FIG. 24A, it is also possible to divide the video images C1 to C16 from the 16 video cameras 101 into two groups each having eight video images and generate one composite video frame from the video images of 8 systems from the video cameras 101 in each group. Specifically, for example, as shown in FIG. 24B, the video images C1 to C8 in the first group are respectively allocated to the divided parts D1 to D8 in one composite video frame and the video images C9 to C16 in the second group are respectively allocated to the divided parts D1 to D8 of the next composite video frame. Similarly, the process of generating the composite video frame is repeated as shown in FIGS. 24D, 24E, . . . In this case as well, at the time of reproduction, in a manner similar to the case of FIG. 23, it is sufficient to further reduce the reduced video image in each divided part, generate one composite video frame from the 16 reduced video images, and display the composite video frame on a screen.

Although the embodiment of the invention has been described above, the invention is not limited to the embodiment but can be variously modified. For example, the invention is not limited to the case of compressing a video signal and recording the compressed video signal but also can be applied to a case where the video signal is, recorded without being compressed. The invention is not limited to the video recording apparatus for monitoring but can be applied to apparatuses of other uses such as recording apparatuses used for various observations.

Although the supplied video images are synthesized by using the memory as a work area and the generated composite video image is recorded together with the additional data onto a video tape in the embodiment, it is also possible to temporarily record a supplied video image as it is on a disk-type recording medium such as a hard disk, perform the video compositing process and the compressing process, and record a composite image obtained by the processes together with the additional information onto a video tape.

Although the input video images in the case of paying attention to each of the video cameras 101 are intermittent data with respect to time in the embodiment, the invention can be also applied to video images which are continuously inputted with respect to time. For example, as shown in FIGS. 25A to 25E, video images from four video cameras 101 of FIGS. 25A to 25D are simultaneously, parallelly recorded in a buffer memory, the reducing process is performed on the captured video images, and the synthesis is carried out. In such a manner, as shown in FIG. 25E, all of video images from the four video cameras 101 can be continuously displayed in a composite video frame. In this case, higher-precision monitoring recording without dropping images can be performed.

Although the configuration in which only the recording of data onto the video cassette tape 7 is performed has been described in the embodiment, the recording and reproducing operations may be simultaneously performed. In this case, by using a dual port RAM having two ports for input and output of data as the memory unit 5, the recording and reproducing operations can be perfectly simultaneously performed. Also in the case of using an ordinary RAM having only one port for input and output as the memory unit 5, for example, by performing the recording and reproducing operations in a time-division manner by using a time slot, at least apparently, the recording and reproducing operations can be simultaneously performed.

Although the case where the video supply sources are the video cameras has been described in the embodiment, the invention is not limited to the case. The video supply source may be a video reproducing apparatus capable of reproducing a video image which has been already recorded such as a video cassette player or a DVD (Digital Video Disk) device.

As described above, according to the video recording apparatus or video recording method of the invention, a plurality of video images supplied are reduced to generate reduced video images and a composite video image is generated by compositing the generated reduced video images, additional information for each of the images supplied is generated, and the composite video image and the additional information are recorded onto a predetermined recording medium in such a manner that the correspondence between each of the reduced video images included in the composite video image and each additional information can be maintained. Consequently, recording video images from a plurality of video supply sources at high density allows, long-time recording, and the reduced video image can be recorded in association with the additional information. Therefore, the reduced video image associated with the recorded additional information can be specified in the composite video image, and the recorded content can be analyzed by effectively using the additional information.

Especially, according to another video recording apparatus of the invention, the composite video image generating means performs a predetermined image compression on a video image obtained by combining the reduced video images and outputs the compressed video image as a composite image. Consequently, higher-density recording can be ralized.

According to still another video recording apparatus of the invention, the recording means records the composite video image and the additional information to the same recording medium. Therefore, it is easy to deal the composite video image and the additional information at a lump after recording.

According to still another video recording apparatus of the invention, by switching video images outputted from a plurality of video supply sources in the time division manner, video images supplied from the video supply sources are captured intermittently. Consequently, longer-time recording can be realized while using the recording medium having a limited recording capacity.

According to the centralized monitoring recording system of the invention, each of a plurality of video images supplied from a plurality of video cameras is reduced to thereby generate a reduced video image. The generated reduced video images are composited to generate a composite video image, and additional information is generated for each of the supplied video images. The composite video image and additional information are recorded on a predetermined recording medium in such a manner that the correspondence between each of the reduced video images included in the composite video image and each of the additional information can be maintained. Recording video images from the plurality of video cameras at high density allows, long-time recording and the reduced video image can be recorded in association with the additional information. Therefore, the video images to be monitored can be continuously recorded for long time without replacing the recording medium, and the recorded video image of each video camera can be analyzed in detail by effectively using the additional information. For example, a desired reduced video image can be easily retrieved from recorded composite video images and the video camera can be easily specified by the additional information.

Obviously many modifications and variations of the present invention are possible in the light of the above teachings. It is therefore to be understood that within the scope of the appended claims the invention may be practiced otherwise than as specifically described.

What is claimed is:

1. A video recording apparatus comprising:
   composite video image generating means for generating reduced signal video images, each comprising less than a complete screen by reducing the number of pixels to be displayed of each of a plurality of video images supplied from frames of each of a plurality of input data streams, a frame from only one of each of said plurality of input data streams being supplied at a time, and generating a composite video image by compositing the generated reduced video images in a substantially non-overlapping manner;
   additional information generating means for generating additional information for each of the supplied video images;
   dividing means for dividing a memory of said recording apparatus into a plurality of blocks, each of said plurality of blocks having a reduced video image, said reduced video image of each block being a composite of images from each of said plurality of input streams;
   video recording means for recording the composite video image and the additional information onto a predetermined recording medium in such a manner of maintaining the correspondence between each of the reduced video images included in the composite video image and each additional information; and
   recording mode switching means for switching the recording from recording the composite video image to a full recording mode for recording one of said video images when a predetermined condition for said one of said video images is met;
   wherein the predetermined recording medium is a tape medium for recording the composite video image in a series of tracks; wherein each track has a video auxiliary area for recording the additional information; and
   wherein the additional information recorded in the video auxiliary area comprises frame division configuration information indicative of an arrangement and a maximum number of reduced video images in the composite video image, recording apparatus identification information for identifying a video recording apparatus used for recording each of the reduced video images, and contents information regarding a contents of each of the reduced video images included in the composite video image.

2. The video recording apparatus according to claim 1, wherein the composite video image generating means performs a predetermined image compression to a video image obtained by combining the reduced video images and outputs the compressed video image as the composite video image.

3. The video recording apparatus according to claim 1, wherein the recording means records the composite video image and the additional information onto the same recording medium.

4. The video recording apparatus according to claim 1, wherein the supplied video images are video images intermittently captured by switching the video images outputted from video supply sources in a time division manner.

5. The video recording apparatus according to claim 1, wherein the additional information includes at least one of supply source information indicative of each of supply sources of the supplied video images, and recording date and time information indicative of date and time on/at which each of the video images is recorded.

6. The video recording apparatus according to claim 1, wherein the supplied video images are video images outputted from a plurality of video cameras.

7. The video recording apparatus according to claim 6, wherein the supplied video images are video images intermittently captured by switching the video images outputted from the video cameras in a time division manner.

8. The video recording apparatus according to claim 1, wherein said predetermined condition is a notification by an abnormality sensor associated with said video image that detects an emergency.

9. A centralized monitoring recording system comprising:
a plurality of input devices for capturing and outputting video images;
composite video image generating means for generating reduced signal video images, each comprising less than a complete screen by reducing the number of pixels to be displayed of each of a plurality of video images supplied from frames of each of a plurality of input data streams, a frame from only one of each of said plurality of input data streams being supplied at a time, and generating a composite video image by compositing the generated reduced video images in a substantially non-overlapping manner;
additional information generating means for generating additional information for each of the supplied video images;
dividing means for dividing a memory of said recording system into a plurality of blocks, each of said plurality of blocks having a reduced video image, said reduced video image of each block being a composite of images from each of said plurality of input streams;
video recording means for recording the composite video image and the additional information onto a predetermined recording medium in such a manner of maintaining the correspondence between each of the reduced video images included in the composite video image and each additional information; and
recording mode switching means for switching the recording from recording the composite video image to a full recording mode for recording one of said video images when a predetermined condition for said one of said video images is met;
wherein the predetermined recording medium is a tape medium for recording the composite video image in a series of tracks; wherein each track has a video auxiliary area for recording the additional information; and
wherein the additional information recorded in the video auxiliary area comprises frame division configuration information indicative of an arrangement and a maximum number of reduced video images in the composite video image, recording apparatus identification information for identifying a video recording apparatus used for recording each of the reduced video images, and contents information regarding a contents of each of the reduced video images included in the composite video image.

10. The centralized monitoring recording system according to claim 9, wherein said predetermined condition is a notification by an abnormality sensor associated with said video image that detects an emergency.

11. A video recording method comprising the steps of:
generating reduced signal video images, each comprising less than a complete screen by reducing the number of pixels to be displayed of each of a plurality of video images supplied from frames of each of a plurality of input data streams, a frame from only one of each of said plurality of input data streams being supplied at a time and generating a composite video image by compositing the generated reduced video images in a substantially non-overlapping manner;
obtaining additional information for each of the supplied video images;
dividing means for dividing a memory of said recording apparatus into a plurality of blocks, each of said plurality of blocks having a reduced video image, said reduced video image of each block being a composite of images from each of said plurality of input streams;
recording the composite video image and the additional information onto a predetermined recording medium using said recording apparatus in such a manner of maintaining the correspondence between each of the reduced video images included in the composite video image and each additional information; and
switching the recording from recording the composite video image to a full recording mode for recording one of said video images when a predetermined condition for said one of said video images is met;
wherein the predetermined recording medium is a tape medium for recording the composite video image in a series of tracks; wherein each track has a video auxiliary area for recording the additional information; and
wherein the additional information recorded in the video auxiliary area comprises frame division configuration information indicative of an arrangement and a maximum number of reduced video images in the composite video image, recording apparatus identification information for identifying a video recording apparatus used for recording each of the reduced video images, and contents information regarding a contents of each of the reduced video images included in the composite video image.

12. The video recording method according to claim 11, wherein the step of generating the composite video image includes a step of performing a predetermined image compression to a video image obtained by combining the reduced video images and outputting the compressed video image as the composite video image.

13. The video recording method according to claim 11, wherein the composite video image and the additional information are recorded onto the same recording medium in the recording step.

14. The video recording method according to claim 11, wherein the additional information includes at least one of supply source information indicative of each of supply sources of the supplied video images, and recording date and time information indicative of date and time on/at which each of the video images is recorded.

15. The video recording method according to claim 11, wherein the supplied video images are video images outputted from a plurality of video cameras.

16. The video recording method according to claim 11, wherein said predetermined condition is a notification by an abnormality sensor associated with said video image that detects an emergency.

* * * * *